FIG. 1
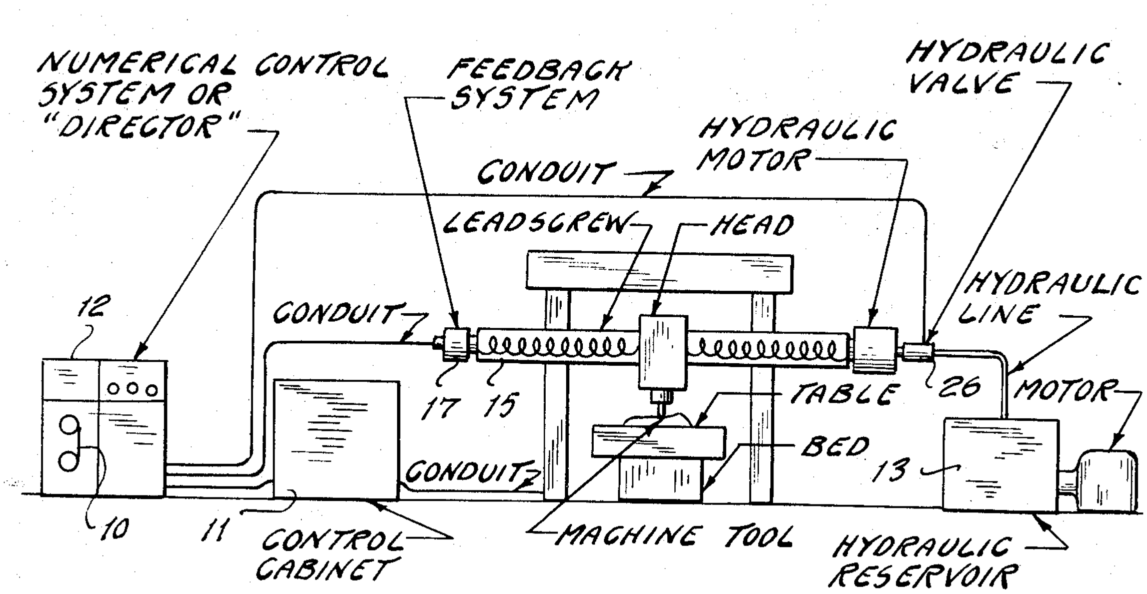
FIG. 4 TAPE-THE CONTROLLING MEDIUM
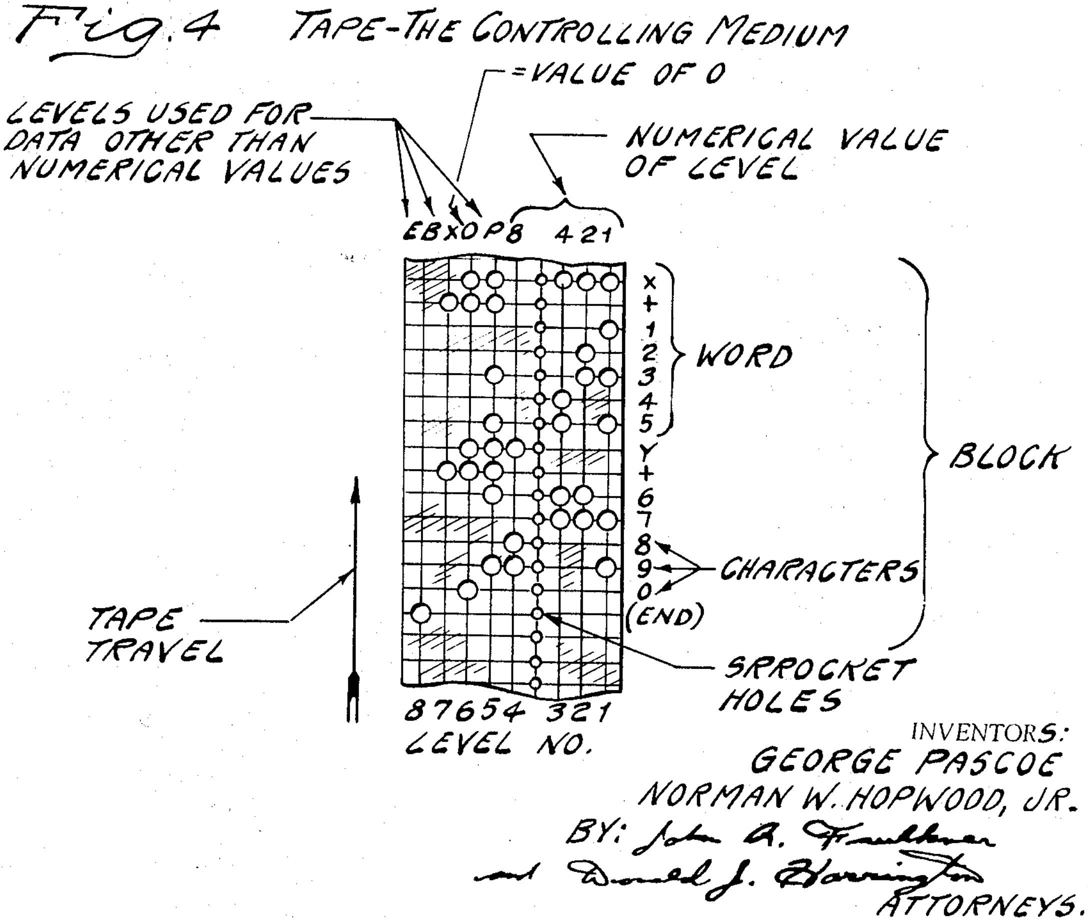
INVENTORS:
GEORGE PASCOE
NORMAN W. HOPWOOD, JR.
BY: John A. Faulkner
and Donald J. Harrington
ATTORNEYS.

INVENTORS:
GEORGE PASCOE
NORMAN W. HOPWOOD, JR.
BY: John A. Faulkner
and Donald J. Harrington
ATTORNEYS.

INVENTORS:
GEORGE PASCOE
NORMAN W. HOPWOOD, JR.
BY: John A. Frankena
and Donald J. Harrington
ATTORNEYS.

INVENTORS:
GEORGE PASCOE
NORMAN W. HOPWOOD, JR.
BY: John A. Frankhouser
and David J. Harrington
ATTORNEYS.

Dec. 15, 1970 G. PASCOE ET AL 3,548,173

NUMERICALLY CONTROLLED SURFACE DEVELOPMENT METHOD FOR PREPARING BODY CONTOURS

Filed Sept. 8, 1966 29 Sheets-Sheet 5

INVENTORS:
GEORGE PASCOE
NORMAN W. HOPWOOD, JR.
BY: John A. [signature]
and Daniel J. Harrington
ATTORNEYS.

INVENTORS:
GEORGE PASCOE
NORMAN W. HOPWOOD, JR.
BY: John A. Haslinger
and Donald J. Harrington
ATTORNEYS.

INVENTORS:
GEORGE PASCOE
NORMAN W. HOPWOOD, JR.
BY: [signature]
and [signature]
ATTORNEYS Dec. 15, 1970 G. PASCOE ET AL 3,548,173

NUMERICALLY CONTROLLED SURFACE DEVELOPMENT METHOD FOR PREPARING BODY CONTOURS

Filed Sept. 8, 1966 29 Sheets-Sheet 8

INVENTORS:
GEORGE PASCOE
NORMAN W. HOPWOOD, JR.
BY: John A. Faulkner
and Donald J. Harrington
ATTORNEYS.

INVENTORS:
GEORGE PASCOE
NORMAN W. HOPWOOD, JR
BY: John A. [signature]
and Daniel J. [signature]
ATTORNEYS.

INVENTORS:
GEORGE PASCOE
NORMAN W. HOPWOOD, JR.
BY: John A. Frankline
and Donald J. Harrington
ATTORNEYS.

INVENTORS:
GEORGE PASCOE
NORMAN W. HOPWOOD, JR.
BY: John A. Fauthner
and Donald J. Harrington
ATTORNEYS.

INVENTORS:
GEORGE PASCOE
NORMAN W. HOPWOOD, JR.
BY: John A. [signature]
and David J. [signature]
ATTORNEYS INVENTORS.
GEORGE PASCOE
NORMAN W. HOPWOOD, JR.
BY: John A. Fanaka
and David J. Harrington
ATTORNEYS.

INVENTORS:
GEORGE PASCOE
NORMAN W. HOPWOOD, JR.
BY: John A. Faulkner
and Donald J. Harrington
ATTORNEYS.

INVENTORS:
GEORGE PASCOE
NORMAN W. HOPWOOD, JR.
BY: John A. Faulkner
and Donald J. Harrington
ATTORNEYS.

INVENTORS:
GEORGE PASCOE
NORMAN W. HOPWOOD, JR.
BY: John A. Frankena
and Donald J. Harrington
ATTORNEYS.

INVENTORS:
GEORGE PASCOE
NORMAN W. HOPWOOD, JR.
BY: John A. Faulkner
and Daniel J. Harrington
ATTORNEYS.

INVENTORS:
GEORGE PASCOE
NORMAN W. HOPWOOD, JR.
BY: John R. Faulkner
and Donald J. Harrington
ATTORNEYS.

INVENTORS:
GEORGE PASCOE
NORMAN W. HOPWOOD, JR.
BY: John A. [signature]
and Daniel J. [signature]
ATTORNEYS.

INVENTORS:
GEORGE PASCOE
NORMAN W. HOPWOOD, JR
BY: John A. Faulkner
and Donald J. Harrington
ATTORNEYS.

INVENTORS:
GEORGE PASCOE
NORMAN W. HOPWOOD, JR
BY: John A. Fradkin
and Donald J. Harrington
ATTORNEYS.

INVENTORS:
GEORGE PASCOE
NORMAN W. HOPWOOD, JR.
BY: John A. Faulkner
and Donald J. Harrington
ATTORNEYS INVENTORS:
GEORGE PASCOE
NORMAN W. HOPWOOD, JR.
BY: John A. Frankson
and Donald J. Harrington
ATTORNEYS.

INVENTORS:
GEORGE PASCOE
NORMAN W. HOPWOOD, JR.
BY: John A. Faulkner
and Daniel J. Harrington
ATTORNEYS.

INVENTORS:
GEORGE PASCOE
NORMAN W. HOPWOOD, JR.
BY: John G. Faulkner
and Donald J. Harrington
ATTORNEYS.

INVENTORS:
GEORGE PASCOE
NORMAN W. HOPWOOD, JR.
BY: John A. Hardham
and Donald J. Harrington
ATTORNEYS.

INVENTORS.
GEORGE PASCOE
NORMAN W. HOPWOOD, JR.
BY: John A. Fraughee
and Daniel J. Harrington
ATTORNEYS.

INVENTORS:
GEORGE PASCOE
NORMAN W. HOPWOOD, JR.
BY: John A. [signature]
and Donald J. Harrington
ATTORNEYS.

INVENTORS:
GEORGE PASCOE
NORMAN W. HOPWOOD, JR.
BY: John A. Frankling
and Donald J. Harrington
ATTORNEYS.

United States Patent Office 3,548,173
Patented Dec. 15, 1970

3,548,173

NUMERICALLY CONTROLLED SURFACE DEVELOPMENT METHOD FOR PREPARING BODY CONTOURS

George Pascoe and Norman W. Hopwood, Jr., Dearborn, Mich., assignors to Ford Motor Company, Dearborn, Mich., a corporation of Delaware Filed Sept. 8, 1966, Ser. No. 577,997
Int. Cl. B23q *17/18;* G05d *3/04*
U.S. Cl. 235—151.11 10 Claims

ABSTRACT OF THE DISCLOSURE

This invention relates to methods for determining analytically the geometric characteristics of both arbitrary, single-plane contours and three-dimensional surface point data and for developing them by means of computer assisted processing techniques wherein the intelligence that is obtained during the processing steps can be stored on a suitable medium, such as punched tape, and subsequently used as a source of data for a numerical control system for a machine tool, such as a multiple axis milling machine.

Our invention relates generally to the manufacture of precision machined objects with arbitrary surface configurations, such as body dies used in forming three-dimensional, nonanalytical surface contours found in automotive vehicle bodies. It relates more particularly to methods for determining analytically the geometric characteristics of both arbitrary single-plane contours and three-dimensional surface point data and for developing them by means of computer assisted processing techniques wherein the intelligence that is obtained during the processing steps can be stored on a suitable medium, such as punched tape, and subsequently used as a source of data for a numerical control system for a machine tool, such as a multiple axis milling machine.

The art of making dies for manufacturing three-dimensional body surfaces with arbitrary contours, as it heretofore has been practiced, involves special toolroom skills of pattern makers, tool makers and model makers. Artistic talents and experience also are necessary to produce the correct aesthetic and functional values that are required in the styling and engineering of automotive body panels.

The improvement of our invention provides a substantial time-saving assist in construction methods used in making wood models, templates and dies in automotive vehicle body design and development. We have combined known processing techniques and die design methods to develop basic mathematical solutions for three-dimensional problems. These can be complemented with appropriate logic and converted into computer programs. The resulting intelligence obtained during the computer assisted processing steps is stored in a numerical control punched tape, which in turn is used by the machine tool control system. The motion of the cutting element of the machine tool is controlled thereafter automatically in response to electrical impulses that are introduced into the tool control system by the numerical control tape. Any of a variety of machine tool functions thus can be achieved, such as the milling machine cutting of automotive body dies which will be described in detail in this specification, and the drilling, tapping, turning, flat milling and other related machining operations for low-volume part production and for the manufacture of prototype parts.

The problem solutions for developing the input data involve the merging of a plurality of points in space into a surface by the use of computer-assisted mathematical procedures and the use of known body tool design technology. In doing this we translate a series of points defining so-called character and section lines on a contour surface, which is presented in two dimensions on a draft plate, into a series of cutter paths which will permit dimensionally accurate machining of the contour surface in three dimensions. The points obtained on the two-dimensional draft are located with respect to two-dimensional axes by a curve fitting process, which also will be described in this specification. These points are merged by interpolation into a mathematically continuous surface within a computer.

A network of mathematically computed points in space can be obtained in this fashion. The density of the points in space is such that the definition for the numerically defined surface will permit machining with a high degree of accuracy and continuity. The two-dimensional data for the surface is obtained from three-dimensional models having the desired finished, three-dimensional surface.

After this stage is completed, the surface can be cut with a machine tool after the cutter center position is located for each of the points in space that are obtained in the foregoing fashion. This requires a cutter offset measured on each of three axes. The offset is defined by the component vectors which determine the tangency of the surface curvature at each of the computed points. These points, which define the body surface and which are developed by interpolation from data obtained from projections of character lines located on the two-dimensional draft, themselves are defined by two geometrical relationships—namely, by the coordinates of the particular points with respect to X, Y and Z coordinate planes and the slopes of the points or their relationship with neighboring points in terms of so-called normal angles. This process corrects automatically any slight discrepancies between the computed coordinates of section end points and the corresponding coordinates of plan and side views of the character lines. The resulting surfaces are mathematically continuous, three-dimensional surfaces between the sections. The three-dimensional offset cutter path that is computed results in profile milling machine cuts that are always tangent to the desired finished surface.

The provision of an improved method for producing two-dimensional and three-dimensional profiles of the type described in the foregoing paragraphs being a principal object of our invention, it is another object of our invention to develop a manufacturing method for producing arbitrary, non-analytical profiles in either two dimensions or three dimensions with improved line or surface continuity and accuracy. We contemplate that this will require only a minimum amount of time for related hand finishing in those instances when the method is applied to the manufacture of wood models, and a minimum amount of time for checking, spotting, barbering and inspection in those instances when the method is used for die construction.

It is a further object of our invention to provide an improved manufacturing method for producing dies for sheet metal bodies wherein perfect symmetry between the right-hand surfaces and left-hand surfaces can be achieved by identical process steps and by using the same control elements. We contemplate that matching male and female surfaces found on metal dies and the companion punches can be produced from the same control elements by employing the same manufacturing steps while providing appropriate center-offsets for the punch and the die and while providing the desired allowance for metal thickness required between the punch and die profiles.

It is a further object of our invention to provide a manufacturing method for producing three-dimensional dies having non-analytical surfaces such as those found in body panel dies wherein the surfaces are characterized by reduced surface irregularities.

For the purpose of describing more particularly the improvements of our invention, reference will be made to the accompanying drawings, wherein:

FIG. 1 shows in schematic form a machine tool system adapted for use with a numerical control director;

FIG. 4 shows a typical punched paper tape, together with a typical block of intelligence, for use in a control system of the type illustrated schematically in FIG. 2;

Figures 13, 14:
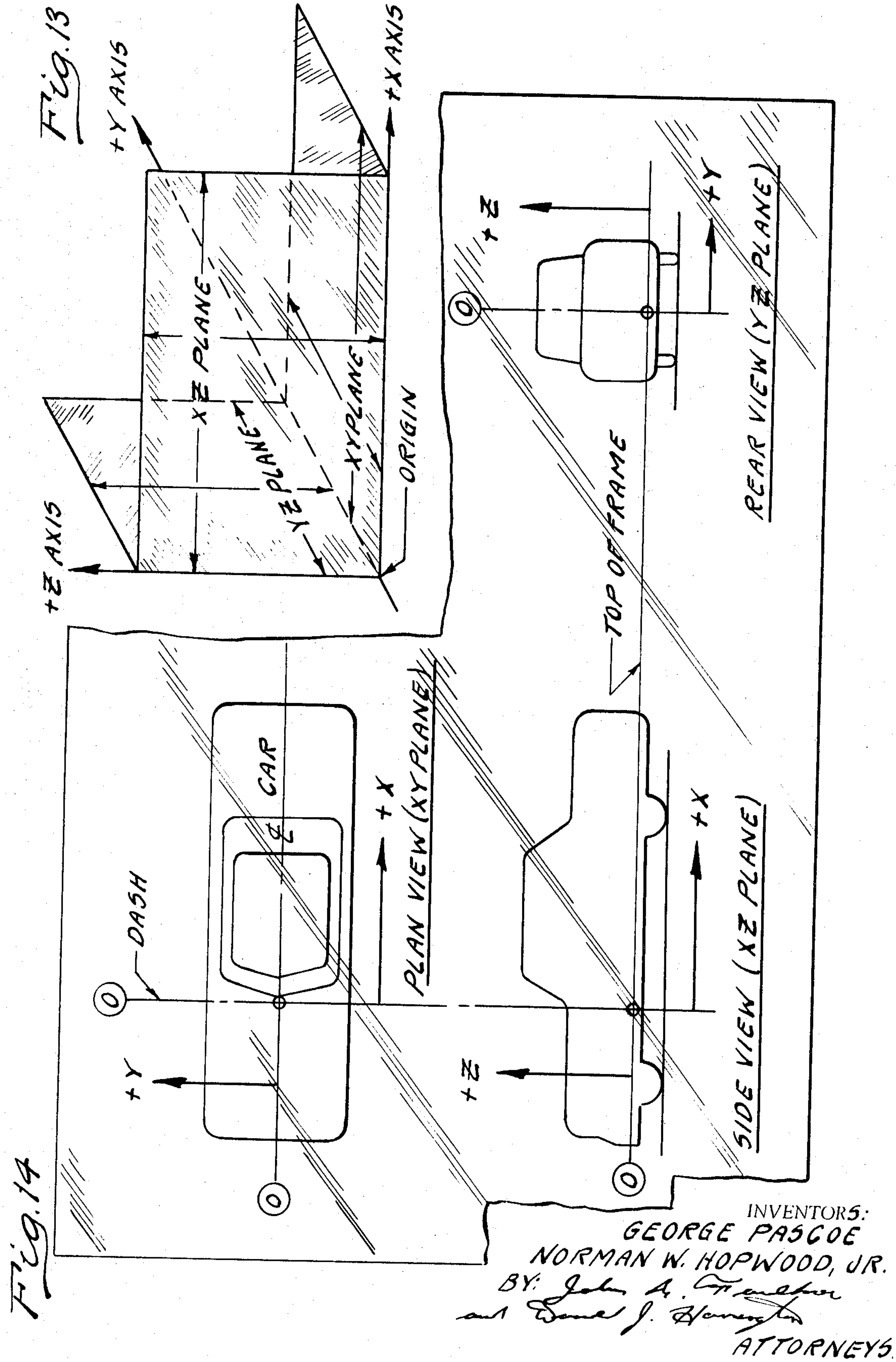
Figure 15A:
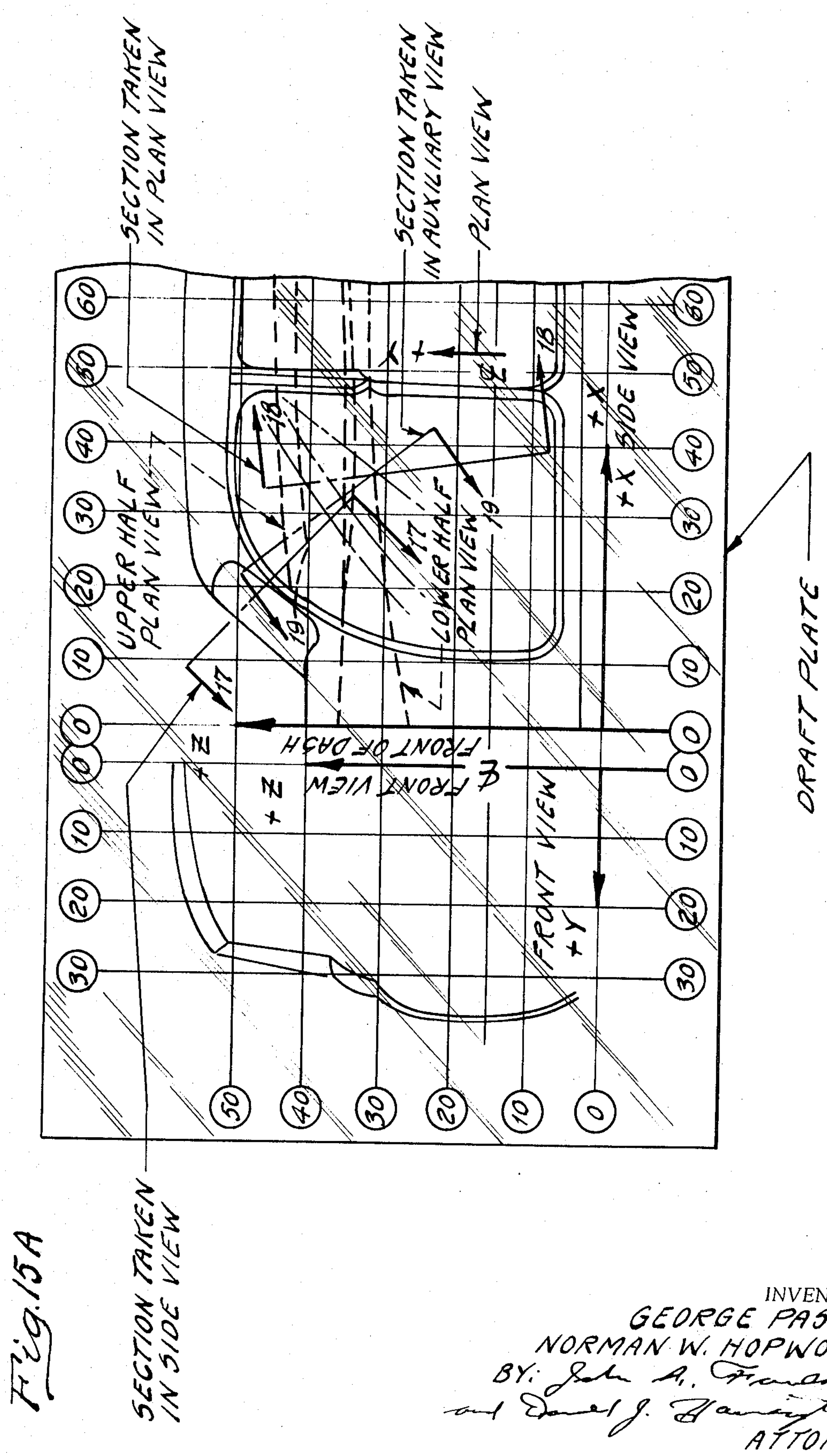
Figure 15B:
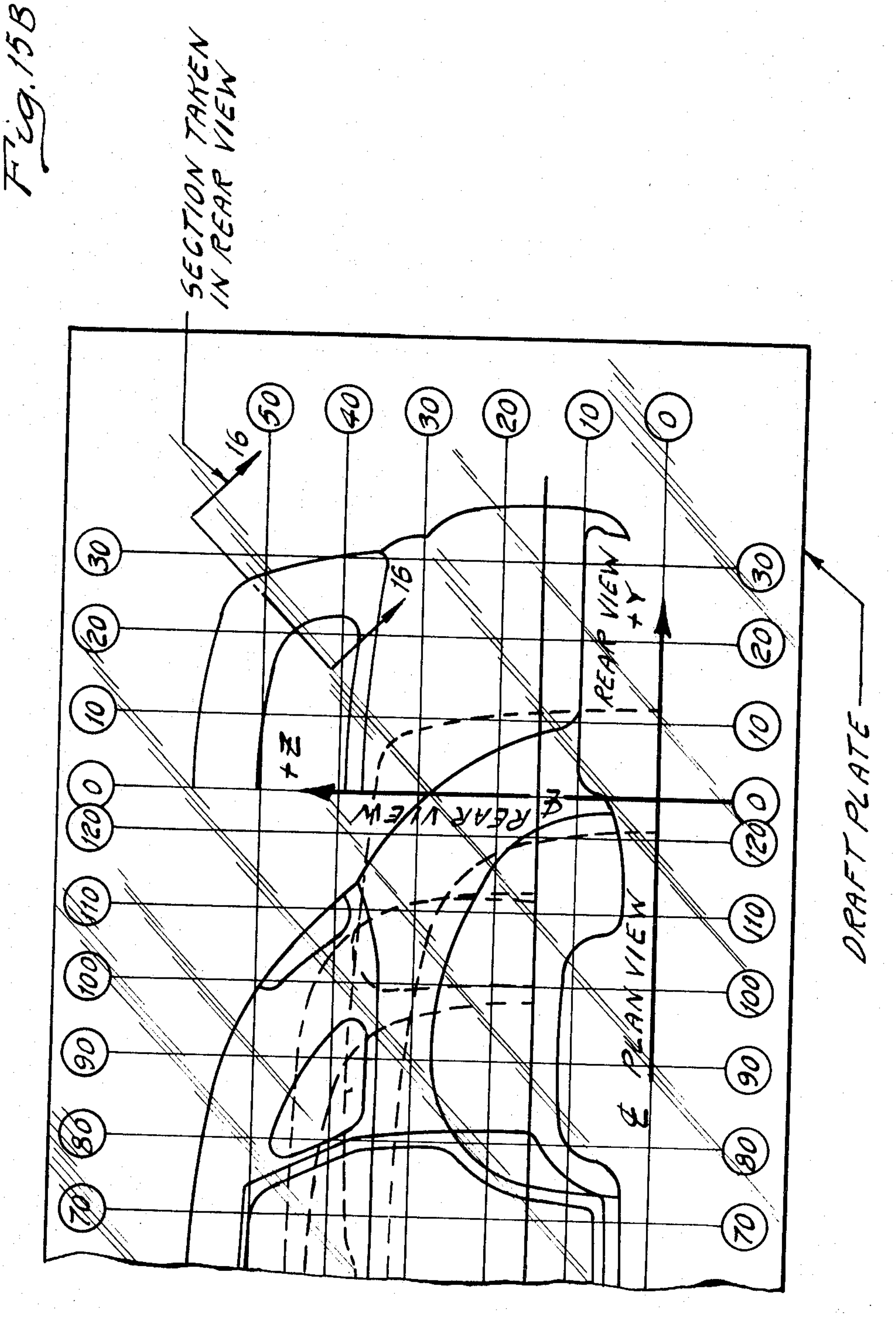
Figure 26:
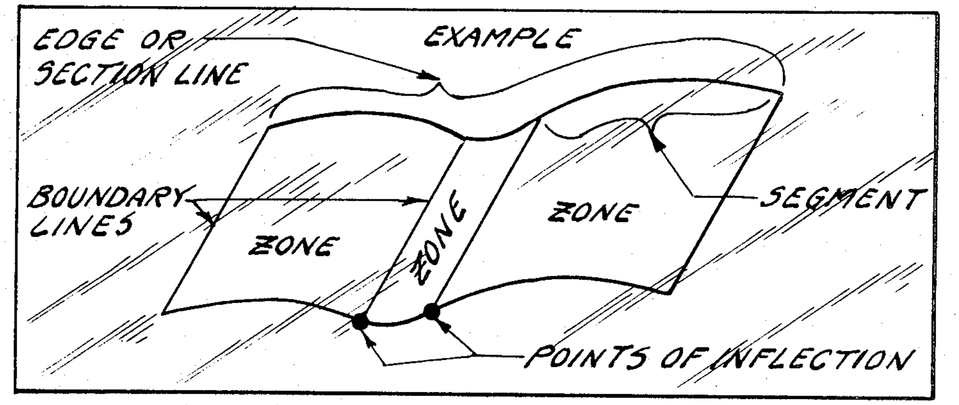
Figure 27:
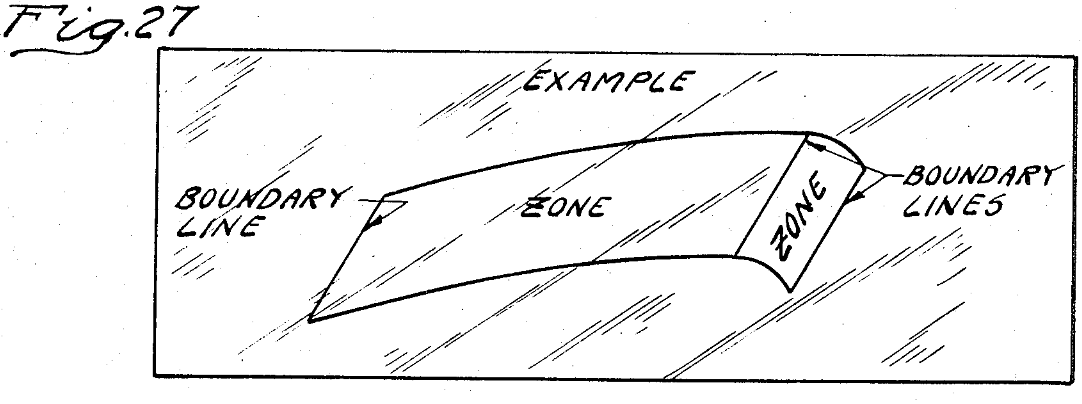
Figure 28:
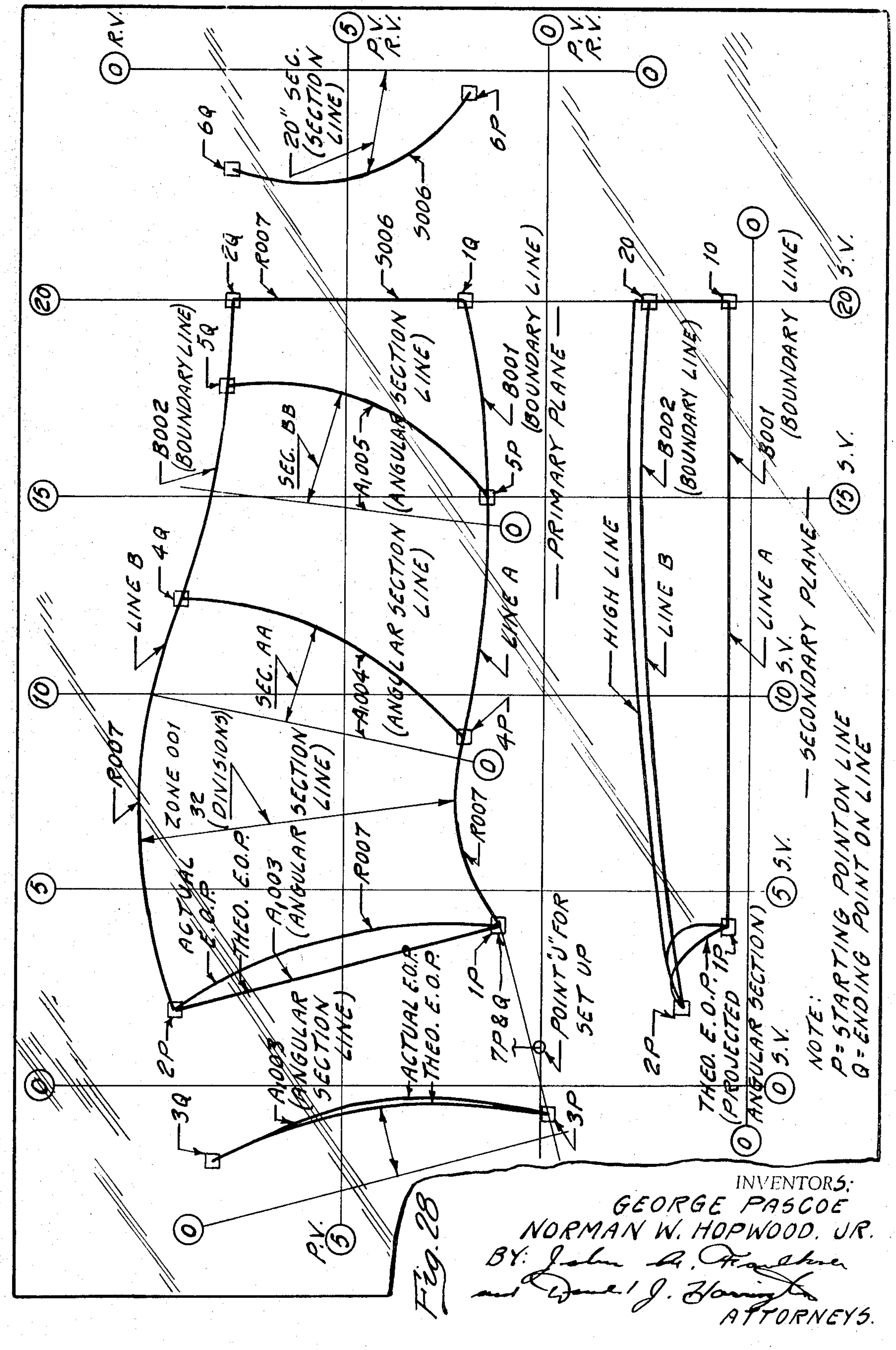
Figure 29:
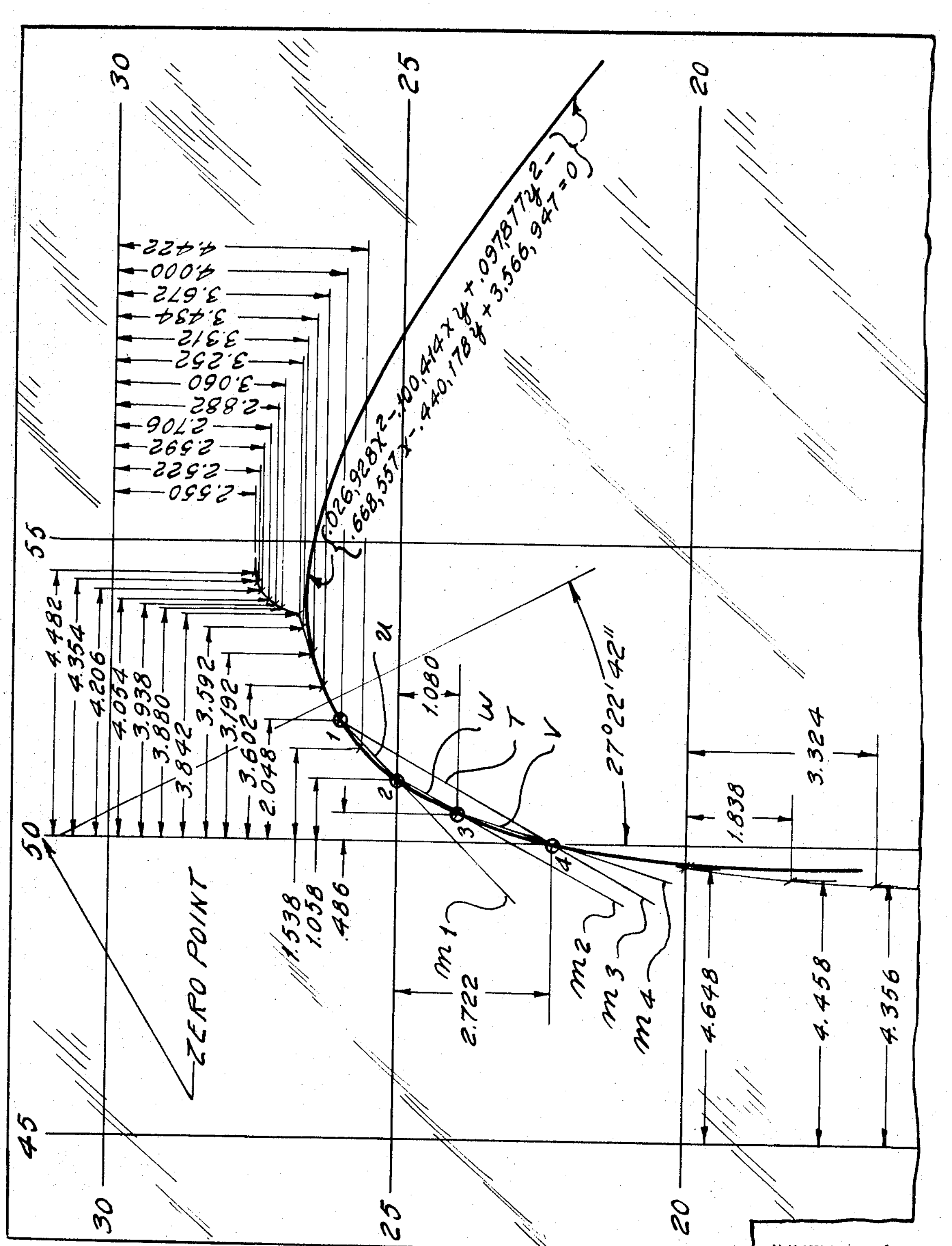
Figures 30, 31:
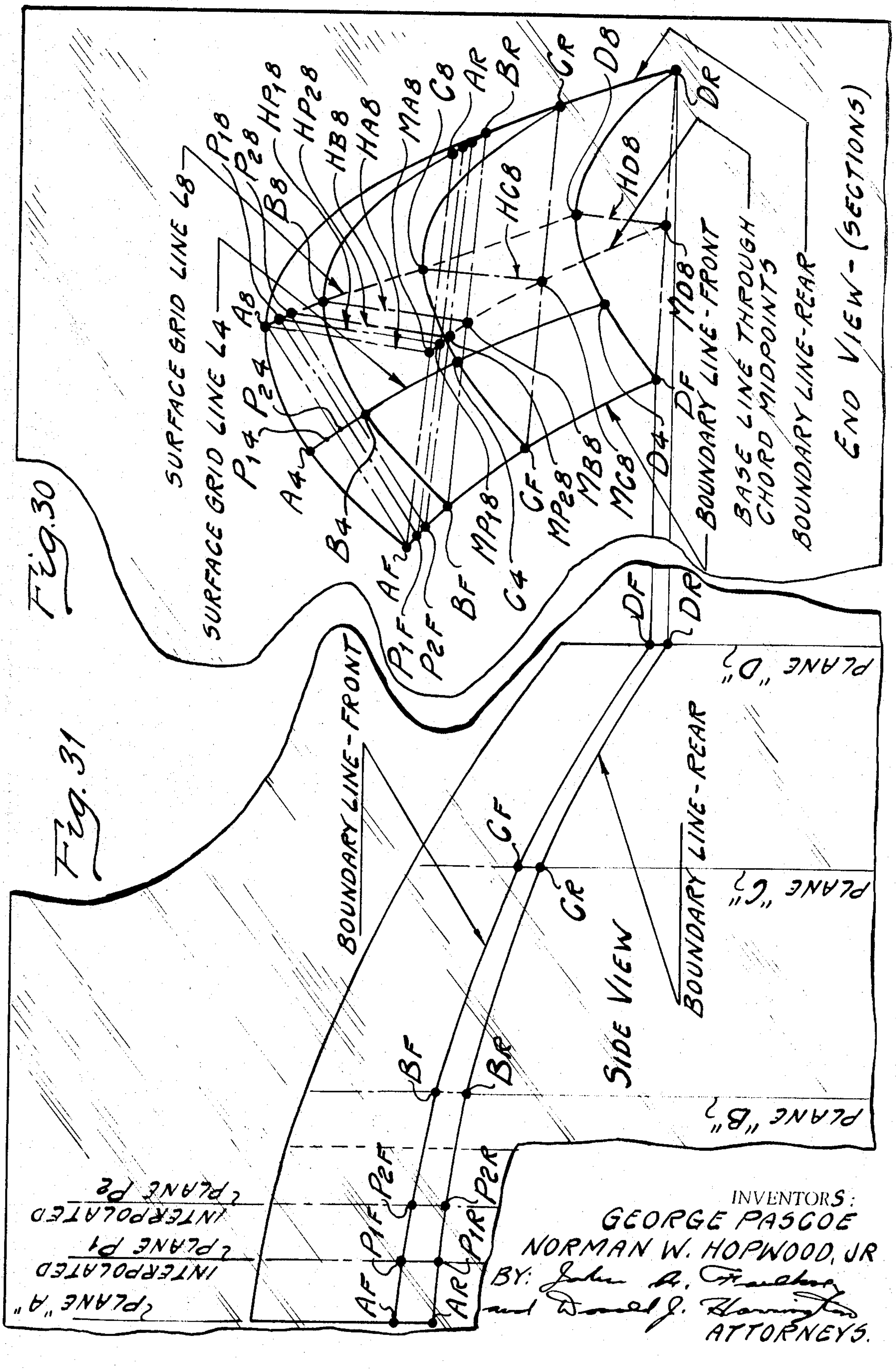
Figure 33:
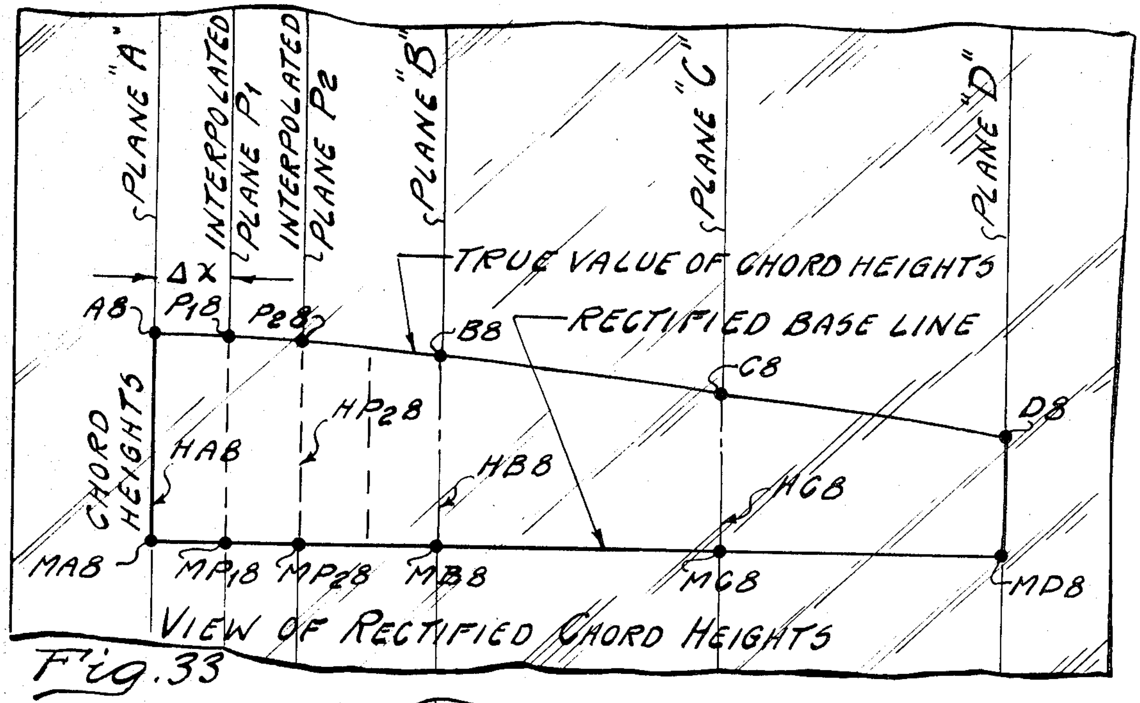
Figure 32:
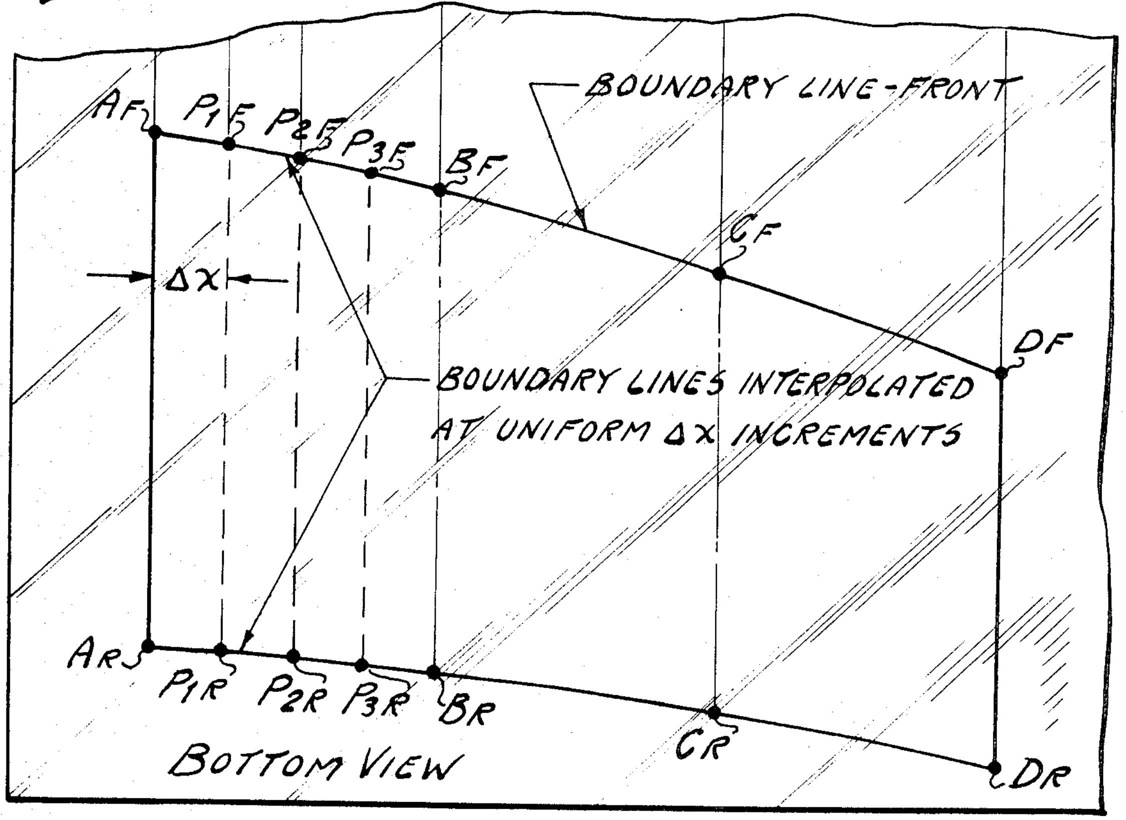
Figure 34:
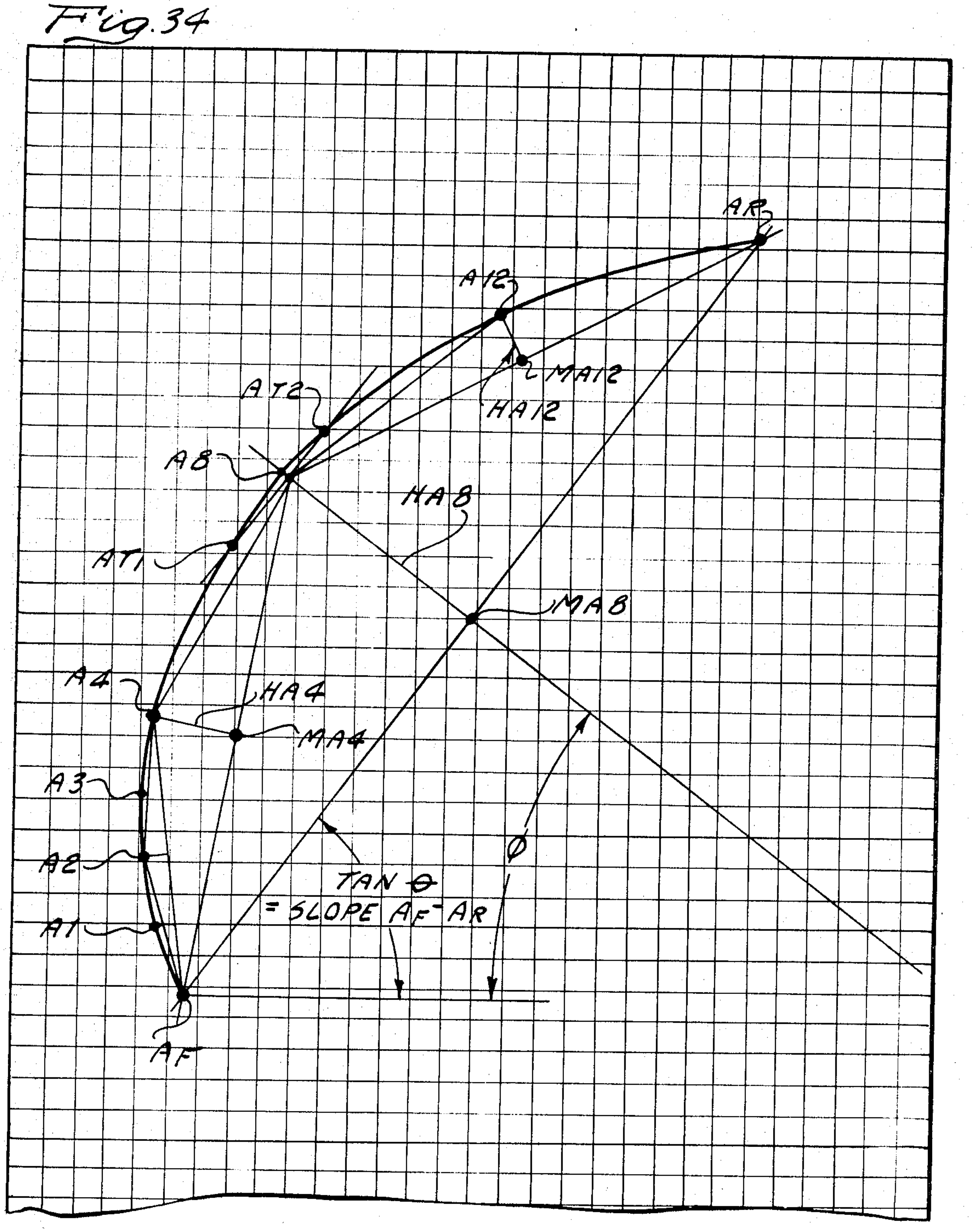
Figures 35, 36:
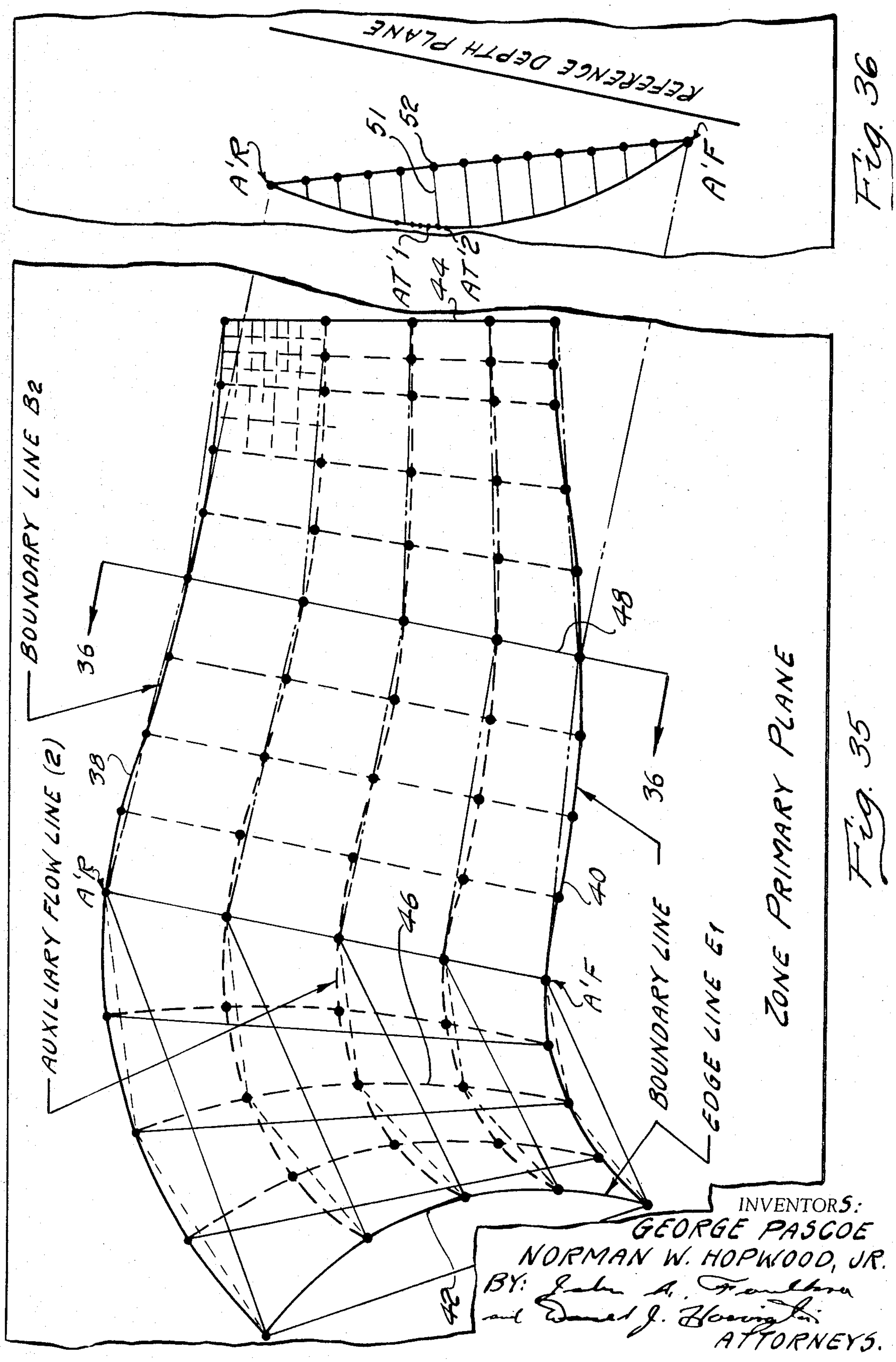
Figure 37:
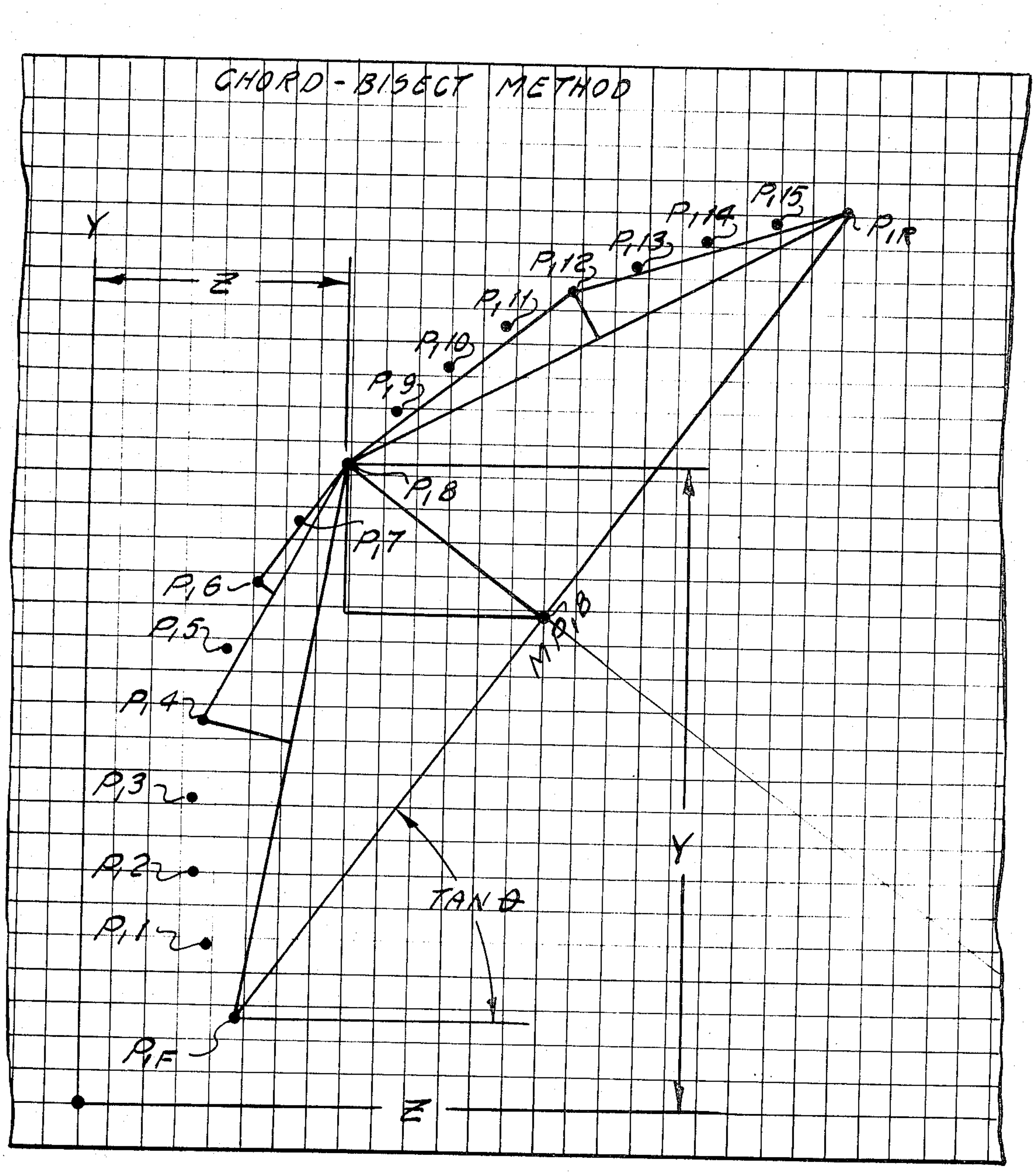
Figures 38, 39:
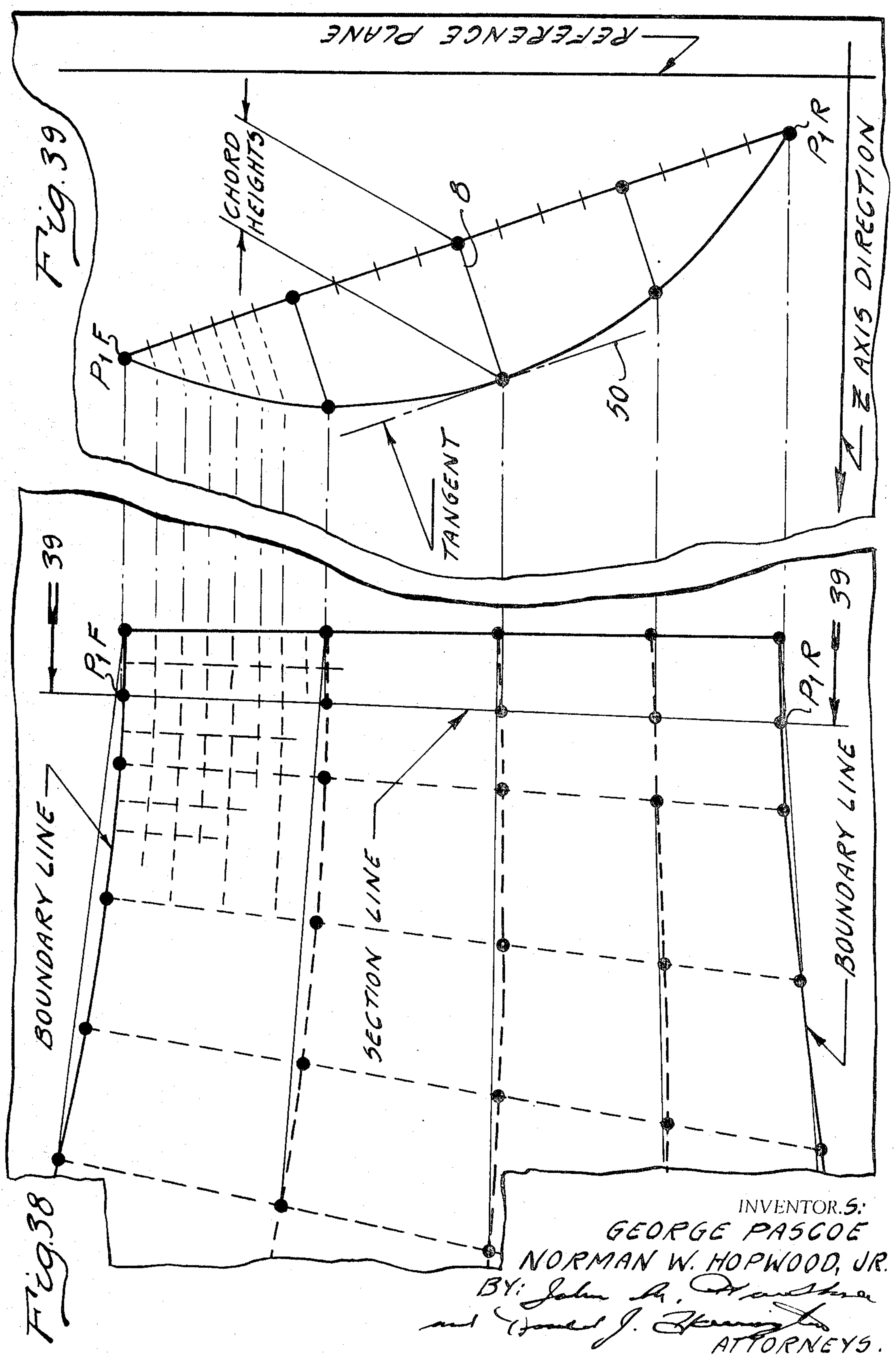
Figures 40, 41:
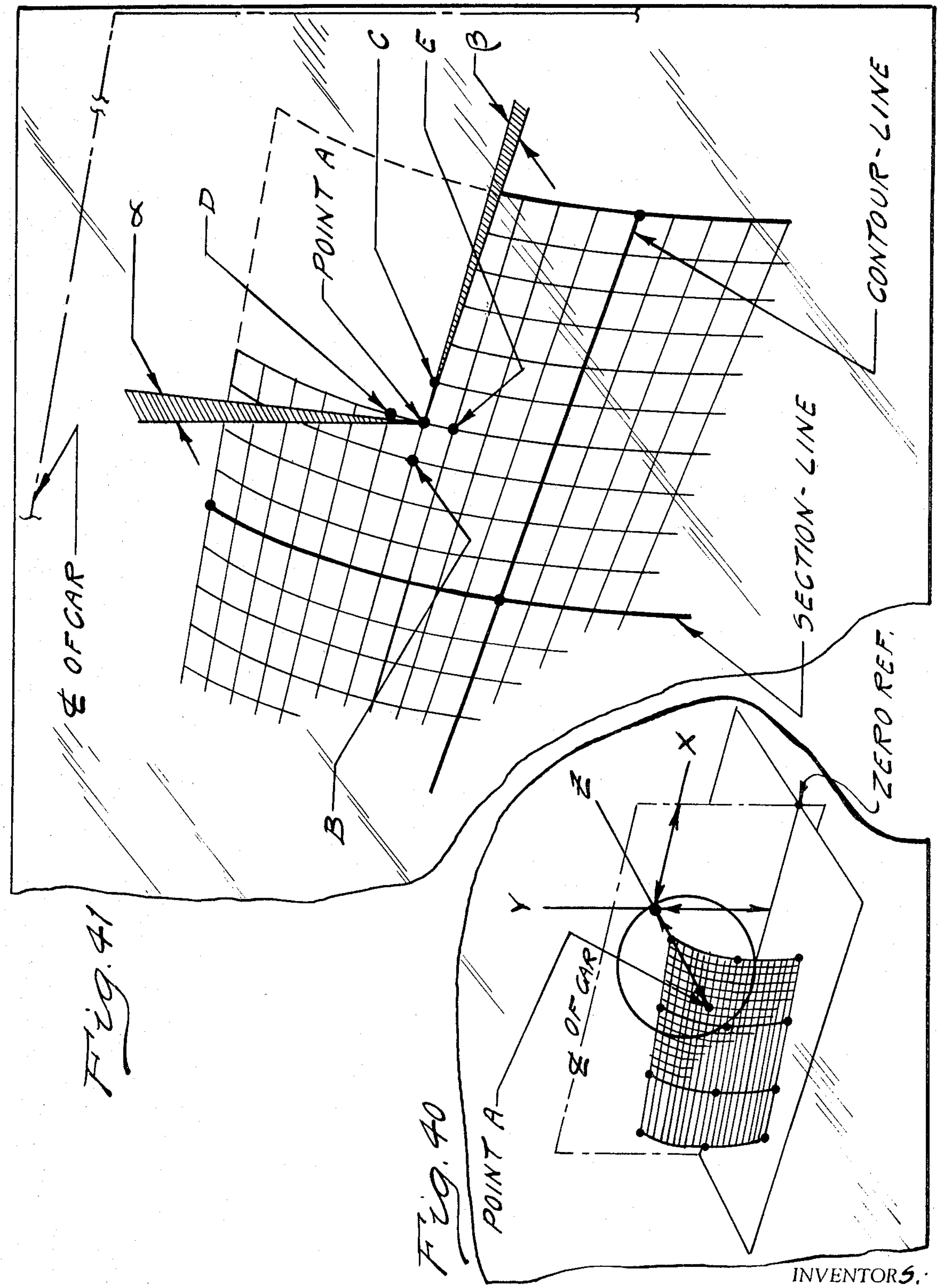
Figure 42:
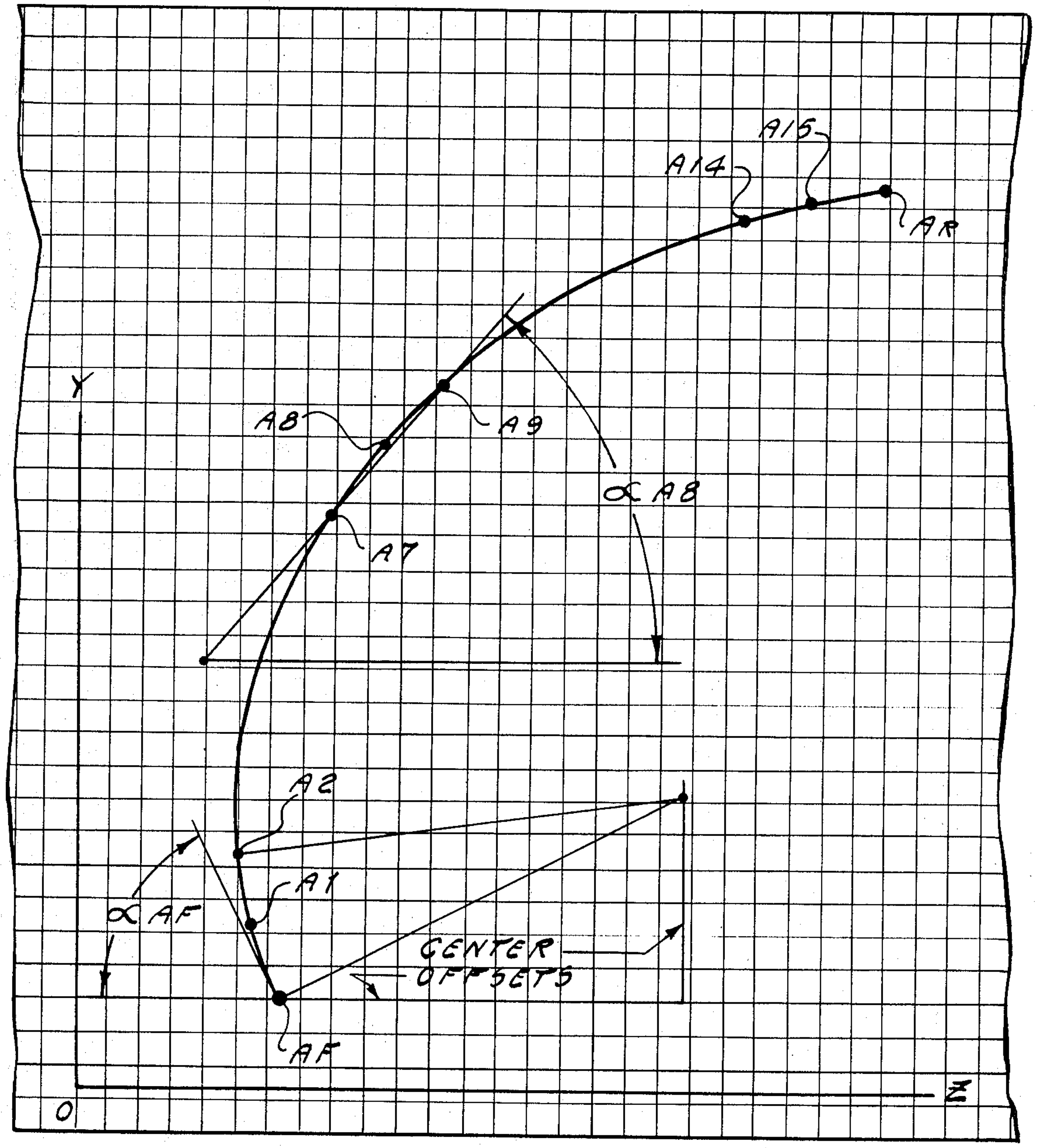
Figure 43:
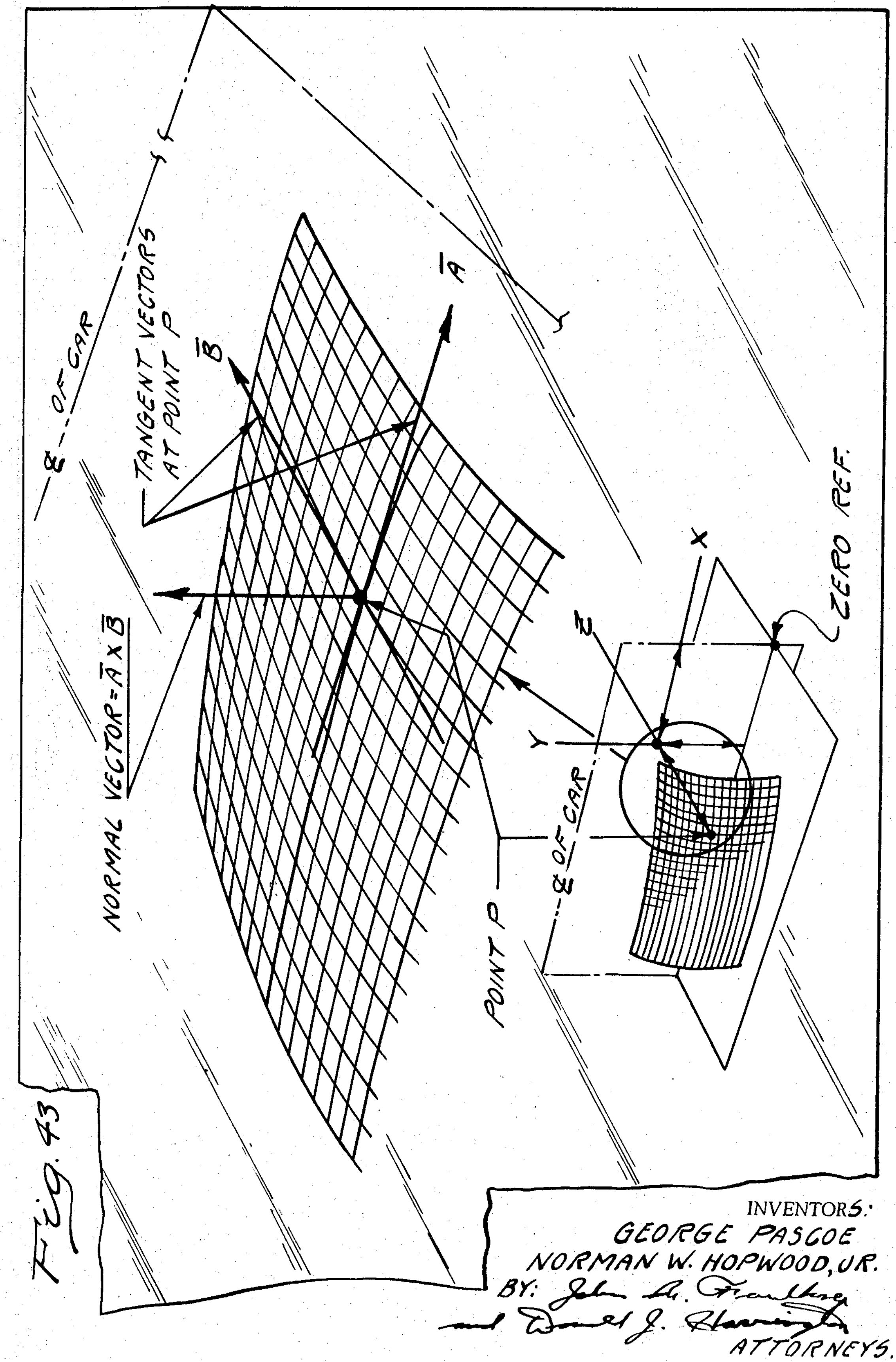

FIG. 13, for purposes of reference, illustrates the nomenclature used in describing the three principal coordinate planes to which the various characteristic planes disclosed here are referred;

FIG. 14 shows in schematic form, and in reduced scale, a plan view, a side view and a rear view of a vehicle body with reference to the principal planes identified in FIG. 13;

FIGS. 15A and 15B show a portion of an actual body draft plate for a vehicle body layout on which the characteristic planes are identified by sectional planes;

FIGS. 16, 17, 18 and 19 show in diagrammatic form the positions of the planes that are identified in FIGS. 15A and 15B by section lines identified respectively by 16—16, 17—17, 18—18 and 19—19;

FIGS. 20, 21, 22, 23, 24, 25, 26 and 27 show in simplified geometric form the surface configurations on selected surface zones for the body surfaces of FIGS. 15A and 15B as viewed along the primary planes, the secondary planes and certain complementary planes;

FIG. 28 shows an actual layout in both the primary plane and the secondary plane of a surface zone such as those illustrated, for example, in FIGS. 26 and 27;

FIG. 29 shows a parabola drawn through four points on one of the characteristic lines shown, for example, in FIG. 28, together with the coordinate data used in computing the equation of the parabola through those four points;

FIG. 30 is a numerical definition of a surface zone that comprises computed points in space;

FIGS. 31 and 32 show respectively a side view, a view of the rectified chord heights and a bottom view of the numerically defined surfaces shown in FIG. 30;

FIG. 33 is a view showing the rectified chord heights taken in the plane identified in FIG. 30 by chord heights MA8, A8, D8 and MD8;

FIG. 34 shows the geometric relationship between points on the characteristic section lines for the surface shown in FIG. 30, the relationship between these points, the chords that connect them and the perpendicular bisectors for the chords;

FIG. 35 shows a surface zone taken on a primary plane, together with the chordal lines connecting certain points in space that define the surface;

FIG. 36 shows a characteristic section line taken along the plane of section line 36—36 in FIG. 35, together with chord height lines taken along the spaced points along the chord;

FIG. 37 shows the geometric relationship between points taken along a characteristic section line of the surface of FIG. 30 as additional points are defined by the chord-bisect method;

FIG. 38 shows a surface grid defined by points in space on a surface zone for the surface of FIG. 30;

FIG. 39 is a sectional view of the surface grid of FIG. 38 taken along the plane of section line 39—39 of FIG. 38;

FIG. 40 shows in schematic, isometric form the surface grid of FIG. 38 with reference to the principal reference planes and with the plane of the center line of the vehicle corresponding to one principal plane;

FIG. 41 shows in an enlarged form a portion of the surface grid of FIG. 40. The region of the surface grid of FIG. 40 that is enclosed by a circle is reproduced in enlarged form in FIG. 41;

FIG. 42 shows the geometric relationship between points in space taken along the characteristic section lines of the surface grid of FIG. 38 together with computed points on the same section lines determined by the average-slope method; and, FIG. 43 shows in schematic form a part of the surface grid of FIG. 38, together with the tangent vectors at a point on the surface grid and the unit normal vector taken at the same point.

Our improved system for forming three-dimensional surfaces requires initially a description of the part to be machined as set forth by a data processor on appropriate data processing sheets. The data processor prepares the sheets from the data obtained from two-dimensional drafts. The system will develop an appropriate machining code which instructs the machine tool to make the part described by the data processor. This is done in three major stages—a so-called translator stage, a calculator stage and a post-processor stage.

In the translator stage the original part program is converted into computer language and is broken down into specific instructions which permit the computer to carry out its calculations as it determines an appropriate sequence for the tool center movement and specifies the path to be followed by the cutter during the production of the part. The post-processor uses the tool centers calculated by the computer, together with information about feed rates, accelerations, the type of cutting pattern to be followed, the numbering of the cutter paths or so-called flow-lines and the intervals between them, the direction of the cutting, the particular tool radius to be used in any particular cutting operation, the clearance planes, certain interruptions that are required during the cutting operation of a particular part, the location of tool set-up points and other pertinent information. A code is developed during the post-processing stage which can be considered to be computer instructions for the numerical director of the particular machine tool used in the manufacturing process.

The cutter motions necessary for generating any particular curve or surface thus are developed without the method for doing so depending upon the curves or surfaces themselves. Because the curves and surfaces of a particular application can be considered to be particular solutions for a general mathematical surface definition, complex calculating routines for each surface zone are avoided since the control routines themselves for each surface zone are common. This is made possible because we have recognized in our development that (i) all surfaces can be defined as a network of closely spaced points in space, (ii) that a parabolic curve can be passed through four such points that are aligned in a first direction, (iii) that a parabolic curve can be passed through another set of four points aligned in another direction wherein one or more of the points of each of the sets of four points are common, and (iv) that the partial derivative, and hence the tangent vector, for each of the parabolic curve segments at the common point can be determined. The normal vector at that common point, which is computed, by preference, by a simple cross-vector-product method, makes it possible to find a unit normal vector. With this information and with the known coordinates of the point itself with reference to the three principal coordinate planes, a common procedure is available for handling all surfaces. The same procedure can be used for producing surfaces found in other surface zones of the same part or in surfaces found on other parts. The single, multiple-purpose portion of the procedure thus provides a framework for solving tool motion problems for any particular surface zone. It is only necessary to complete or fill out the framework in any particular instance by carrying out the necessary subroutines to establish the appropriate coordinate points and their unit normal vectors.

The numerical control installation that is used in carrying out the improved method of our invention may include an electronic system or director 12, as indicated best in FIG. 1. Between the director and the machine tool itself is an operator's console, which is located as close to the machine as possible. This contains the necessary controls for operating the machine manually. It permits the setting-up of work pieces before the automatic operation begins. The system includes also a magnetics cabinet 11 for containing the magnetic relays and starting switches for controlling the operation of the hydraulic and coolant pumps, the spindle motor and other electrical devices. The magnetics cabinet is controlled by signals from the director 12.

Also seen in FIG. 1 is a hydraulic pump and reservoir supply 13 for the fluid for operating the hydraulic motors for the tool itself. The hydraulic fluid is regulated by a valve 26, which is controlled by the director. The amount of the fluid and the rate of flow through the valve determines the distance moved and the rate of travel of the moving elements.

As the lead screw 15 rotates, the feedback device 17 shown in FIG. 1, which may be attached to either end of the lead screw, records the movement of the powered element and sends appropriate feedback signals back to the director. The director then compares these signals with the input instructions as described by the numerical control punched tape 10 and continues to send activating signals to the valve until a balanced condition exists between the command signals, as read from the tape, and the feedback signals as generated by the movement of the machine components.

Figure 2:
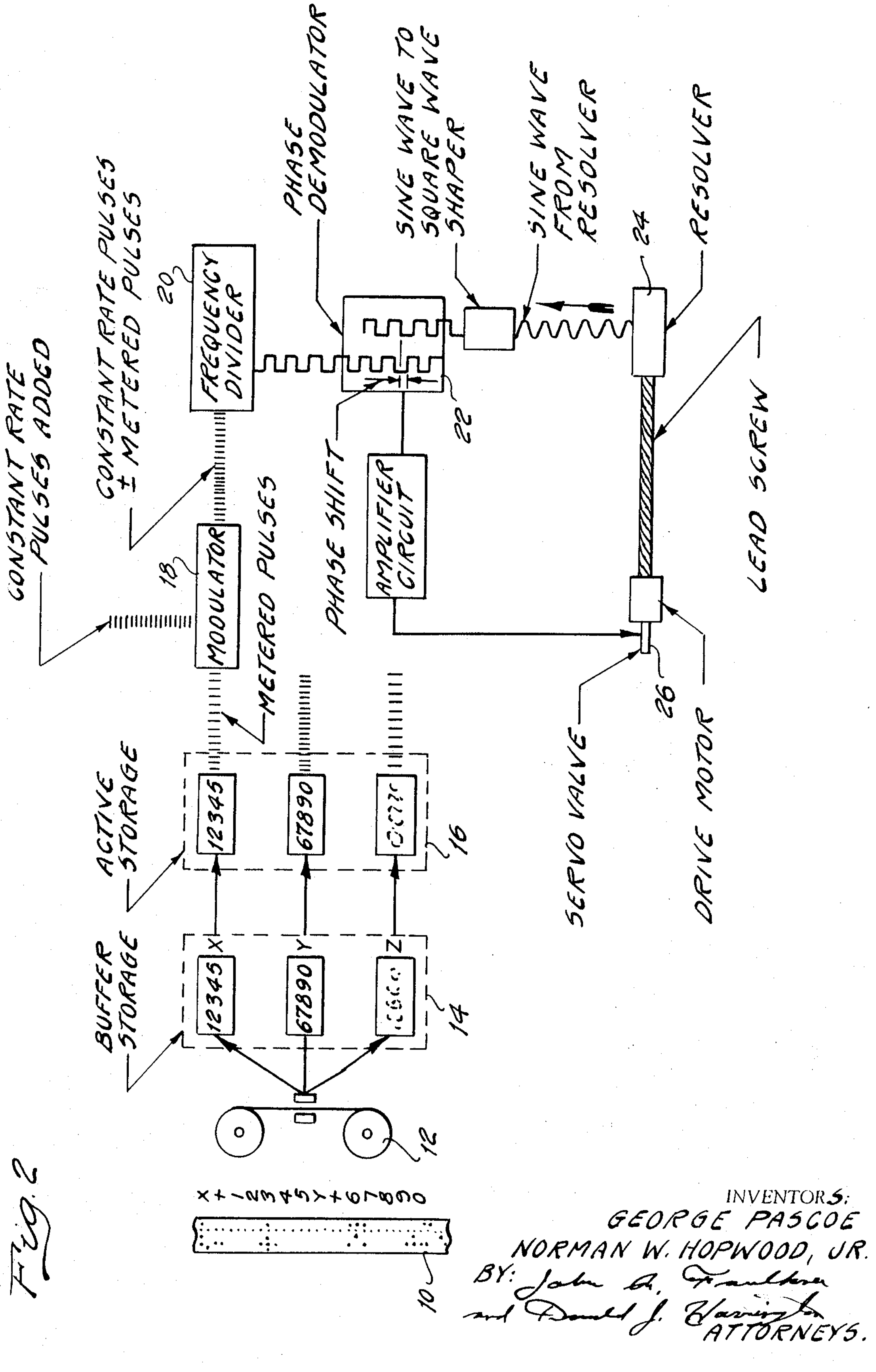
FIG. 2 shows in schematic form a numerical control system for use in a machine tool of the type illustrated in FIG. 1.

In FIG. 2 we have shown in further detail, but in general schematic form, the functional concept of the director. The tape reading portion of the system on the left-hand side of FIG. 2 receives the numerical data on the tape and shifts it to the electronic storage section. If it is assumed that the machine tool involved has a three axis (X, Y and Z) coordinate control, data must be fed to the separate appropriate storage sections. In the FIG. 2 schematic arrangement of the numerical control system there is shown a buffer storage section 14 and an active storage section 16. The buffer storage section accepts the data from the tape reader in director 12 while the machine is operating under the instructions contained in the active storage section 16.

Any curved line falling in one of the coordinate planes can be considered to be a series of very short segments, and each segment requires a block of taped information. It is the function of the buffer storage section, therefore, to prevent interruption of the feed motion along the prescribed cutter path prior to each cutting motion corresponding to the line segment involved as the system reads the tape block for the forthcoming motion. The buffer storage section eliminates this interruption, and the rate then is not limited by the speed of the tape reader.

The active storage section functions to distribute electrical voltage pulses for regulating the motion of the tool in one of the coordinate axis directions. The number of pulses and the rate at which they are distributed depends upon the distance to be moved and the feed rate. Each pulse represents a distance of .0001 inch. It would be necessary, for example, to establish 12,345 electrical pulses in order to obtain a tool movement of 1.2345 inches. If a rate of travel of ten inches per minute is desired, these pulses must be metered out in .12345 minute or approximately 7.4 seconds.

In a contouring system wherein the movements of the machine tool occur relative to two or more axes, the motions must be coordinated. Thus the train of pulses must be measured in order that the required number of pulses for each axis might be completed at precisely the same time as the others.

Pulses generated from the taped instructions, which are the command pulses, are compared to the feedback pulses generated in response to movement of the machine tool. This often is done by converting the command pulses to a wave pattern which may be compared with another wave pattern that is generated by the feedback system such as that found in conventional closed loop arrangements. The command instruction then may be compared with the actual position of the tool and an adjustment made to correct the difference, if any.

In the FIG. 2 schematic system, consideration is given only to the control of the motion in one axis, such as the X axis. Control of the motion in the direction of the other two coordinate axes, however, is similar to that which is shown. The metered pulses are received in the FIG. 2 system by modulator 18 where the pulses are superimposed on pulses of constant rate that are added from an extraneous source. The modulator 18 adds the command pulses to the constant rate pulses if the tool motion is in a positive direction and subtracts them if the tool motion is in a negative direction. The resulting pulse pattern, which contains the carrier pulses plus or minus the command pulses, is passed through a frequency divider 20 which reduces the number of pulses and converts the output to a square wave. This resulting square wave then is fed to a demodulator 22 which compares this input with the input from a rotary resolver 24 connected to the machine tool lead screw. The output of the phase demodulator is a DC voltage, the magnitude of which is proportional to the phase difference between the two inputs. This voltage then is amplified, as shown in the drawing, and fed to the hydraulic servo valve which controls the flow of fluid to the driving motor for the lead screw.

We contemplate that the machine tool used in carrying out our improved method may include a parabolic point interpolater such as that found in multiple axis milling machines. Thus if command instructions based upon the coordinates of a series of three points in space are delivered to the machine tool, the cutting tool path that is followed as it progresses from one position on the cutting surface corresponding to a first of the calibrated points to a second position corresponding to another calibrated point and from that position to a position corresponding to the third calibrated point, the path of the motion will follow a segment of a parabolic arc rather than a straight line.

Figure 3:
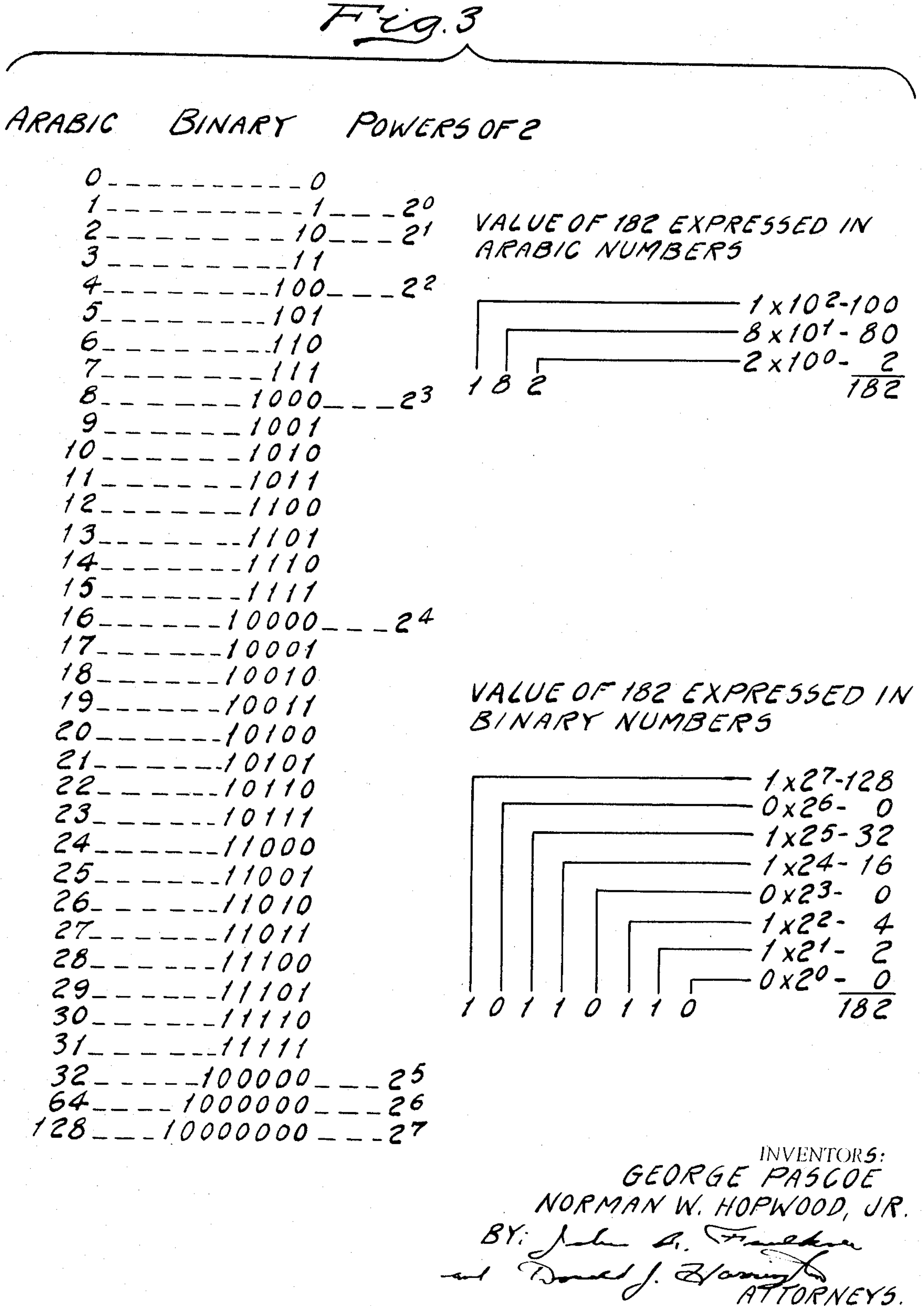
FIG. 3 shows a table of binary numbers and corresponding arabic numbers.

The intelligence that is imparted to the punched tape 10 for transmission in the director employs the well-known binary decimal code system, which is based upon powers of 2 instead of 10. This system lends itself to easy translation in a numerical control system. It is expressed as follows:

$$N=\sum_{0}^{i}10^{i}\sum_{0}^{3}A_{n_i}2^{n_i}$$

where $i$=position number of the decade, and $n_i$=position number of the mark within the decade Thus, any numerical quantity can be expressed without more than two different designations. The designations often used are 1 and 0, as indicated for example in FIG. 3 where a series of binary numbers represented with the designations 1 or 0 are situated adjacent the corresponding arabic numbers. FIG. 3 also shows an example number, i.e. 182, in both designators.

When the binary system is applied to punched tape, the designations that are used are holes or an absence of a hole. This is convenient since electrical circuits are stable in either one of two conditions—either charged or discharged, on or off, conductive or non-conductive, positive or negative, and so forth. The use of a hole in the tape can be made equivalent to the binary numeral 0. Absence of a hole is equivalent to numeral 1.

In a punched tape the collection of holes aligned across the tape represent any one number. A group of holes is called a character. A "word' is an ordered set of characters which may be used to cause a specific action of a machine tool. A block is a group of words considered as a unit, offering a complete instruction for a specific movement of the machine tool.

The tape is read by a tape reader in the control system by presenting one block at a time. An example of a punched tape with the appropriate legends is shown in FIG. 4.

Figure 5A:
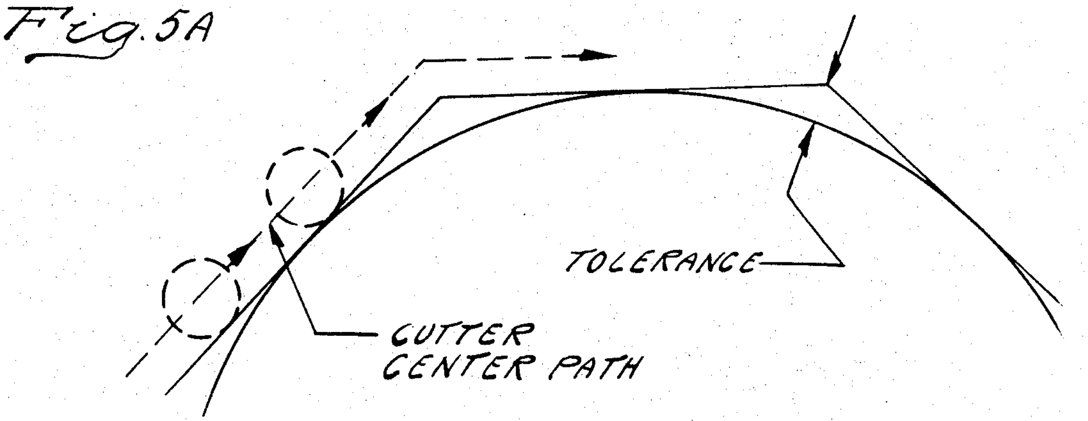
FIGS. 5A and 5B show in exaggerated schematic form two typical cutter center paths that might be used in machining a three-dimensional surface with arbitrary surface contours.
Figure 5B:
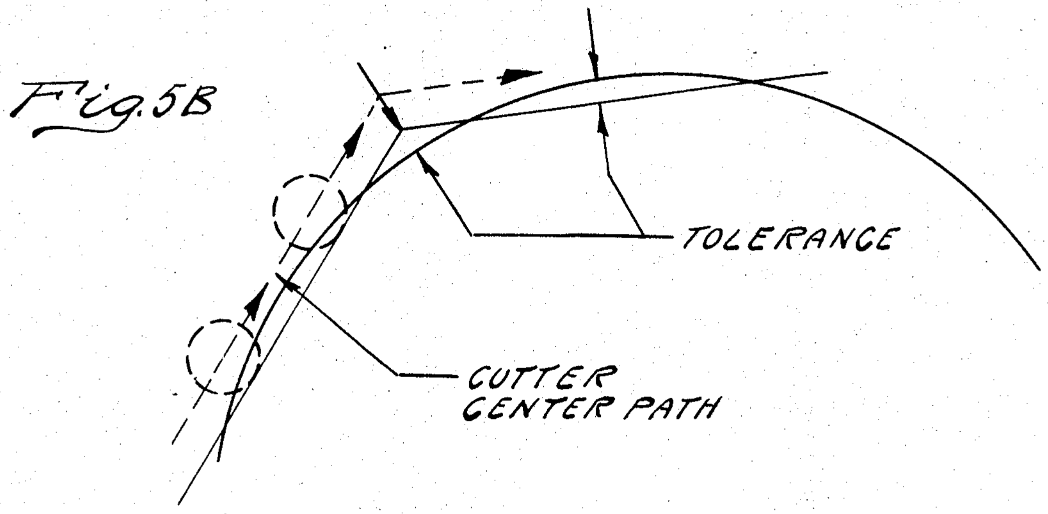

In order to illustrate the manner in which the machine control data can be stored on such a punched tape, we now will illustrate in very simplified fashion how the machining instructions for machining a contoured part can be stored on the machine control tape. For purposes of this description it will be assumed that the contouring machine will move in straight line increments and that the part surface that is cut will consist of a number of straight line cuts set apart from each other with a close tolerance with respect to a curved surface. FIGS. 5A and 5B show two methods for representing a curved surface by means of straight line segments. In the first case the straight line is tangent to the desired curved surface. In the case of FIG. 5B the straight lines are mean chord lines drawn through the curve. The instructions of the tape must describe the path in the center of the cutting tool as shown by dotted lines around the perimeter of the part.

Figure 6:
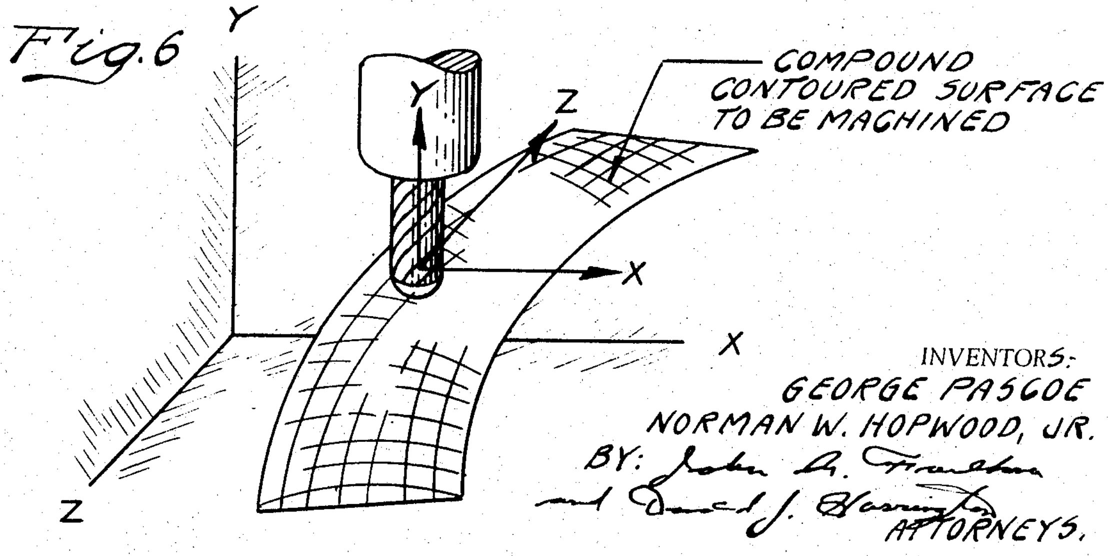
FIG. 6 is a schematic representation of the relationship between a ball-end milling cutter and a compound contoured surface with reference to the three principal coordinate axes.

As seen in FIG. 6 the straight line components must be expressed in terms of the X, Y and Z axes which determine the path of the travel of the cutter.

The manual calculations used in the mathematical steps for programming a contoured part are explained here simply to illustrate the concept. In practice, however, the calculations are carried out with the assistance of a computer as will be explained subsequently.

Figure 7A:
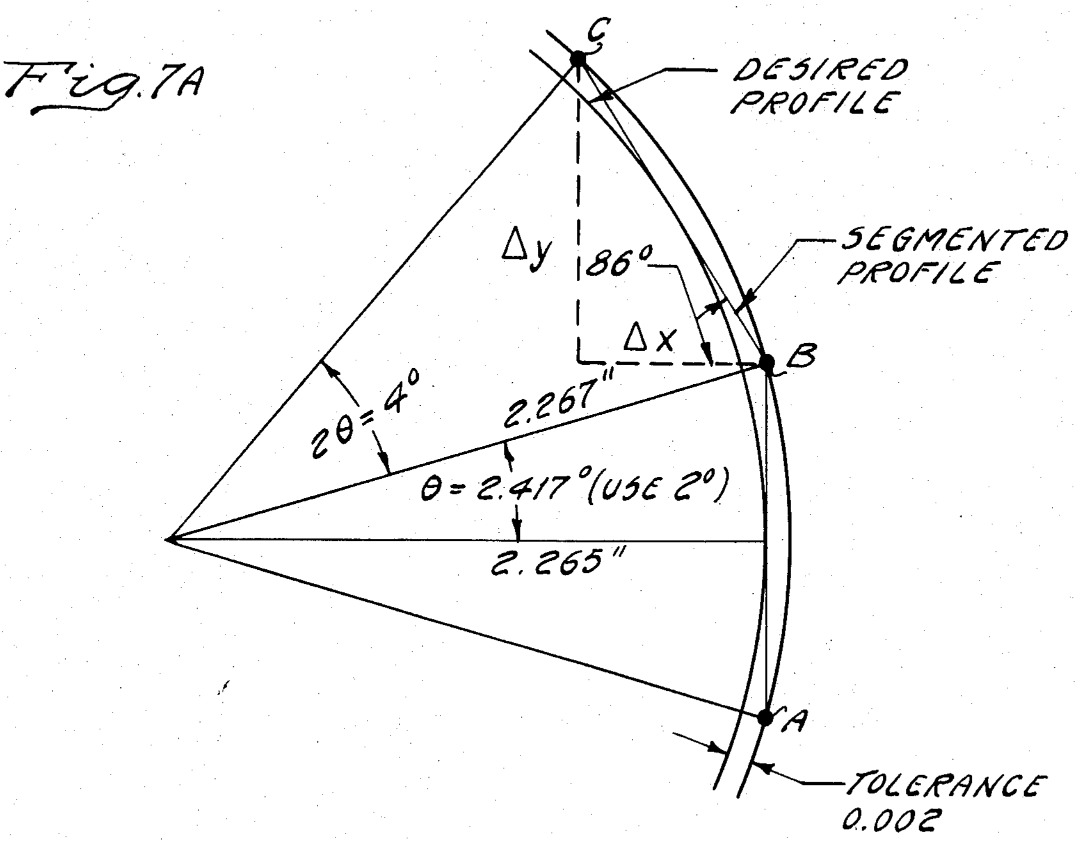
FIG. 7A shows a geometric representation of a segment of a surface contour, together with the construction lines used for the purpose of determining the binary values for recording on a punched tape of the type illustrated in FIG. 7C.

If it is assumed that the part radius and profile are like that shown in FIG. 7A, the arc can be broken into straight line segments as indicated at CB and BA for the arcuate segment CA. Simple calculations are necessary in order to determine the $\Delta x$ and $\Delta y$ components shown in FIG. 7B. This is done in the following fashion:

Referring to FIG. 7A:

| | |
|---|---|
| Mean outside diameter of groove (use) | =4.730″ |
| Mean outside radius of groove | =2.365″ |
| Mean width of groove= cutter diameter (use) | = .200″ |
| cutter radius | = .100″ |
| Radius of the cutter path | =2.365″—cutter radius<br>=2.365″—.100<br>=2.265″ |
| Tolerance on radius= +.0035″, —.0015″ | |

Figure 7B:
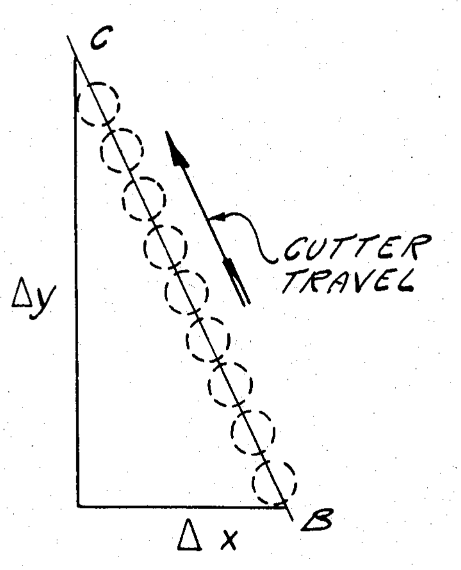
FIG. 7B shows in schematic form a part of the segment arc shown in FIG. 7A for the purpose of completing analytically the cutter travel path data.

In FIG. 7B, the cutter will travel along the chord line B–C although tape instructions denote the distances $\Delta x$ and $\Delta y$. Therefore again referring to FIG. 7A:

$$\cos\theta=\frac{2.265}{2.267}=.99911$$

$$\theta=2°25'$$

$$=2.417°;\ \frac{180°}{2.417°}=74.55 \text{ equal angles}$$

Use 90 angles of 2° each; or 45 angles of 4° each to determine the total length of the straight line segment.

½ the segment length =Sin $\theta\times2.267''$
=Sin $2°\times2.267''$
=$.0349\times2.267''$ Full segment length =$2\times.07912''$
=.158″

Assuming that the line A–B is vertical and therefore parallel to the Y axis the tape instructions would be $\Delta x=0$, since there is no $x$ movement, and $\Delta y=.158''$ which is the length of $y$ travel between A and B in FIG. 7A. When calculating the movement of the cutter from B to C both the $\Delta x$ and $\Delta y$ must be calculated, $\Delta x$ in this instance would be:

$$\Delta x=.158\ \text{Cos}\ \phi$$

where $$\phi=86°$$

Therefore $$\Delta x = .158 \text{ Cos } 86^\circ$$
$$= .158 \times .0698$$
$$= .0110''$$
$$\Delta y = .158 \text{ Sin } 86^\circ$$
$$= .158 \times .9976$$
$$= .1580''$$

Figure 7C:
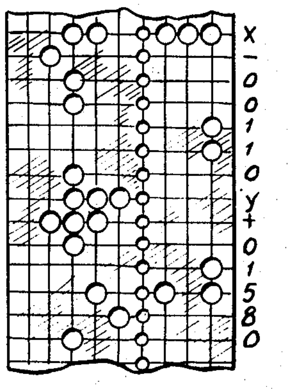
FIG. 7C shows a portion of a punched control tape containing the information determined with reference to FIGS. 7A and 7B.

The taped instructions will appear on the tape as shown in FIG. 7C.

During the early stages of our improved method, part surface data on the two dimensional draft is used in conjunction with numerical process sheets. The process sheets instruct the programmed computer on how to deal with the surface data put on punched process cards which are used to provide a resultant tape, such as that previously described, which directs the machine tool operation.

Figure 8A:
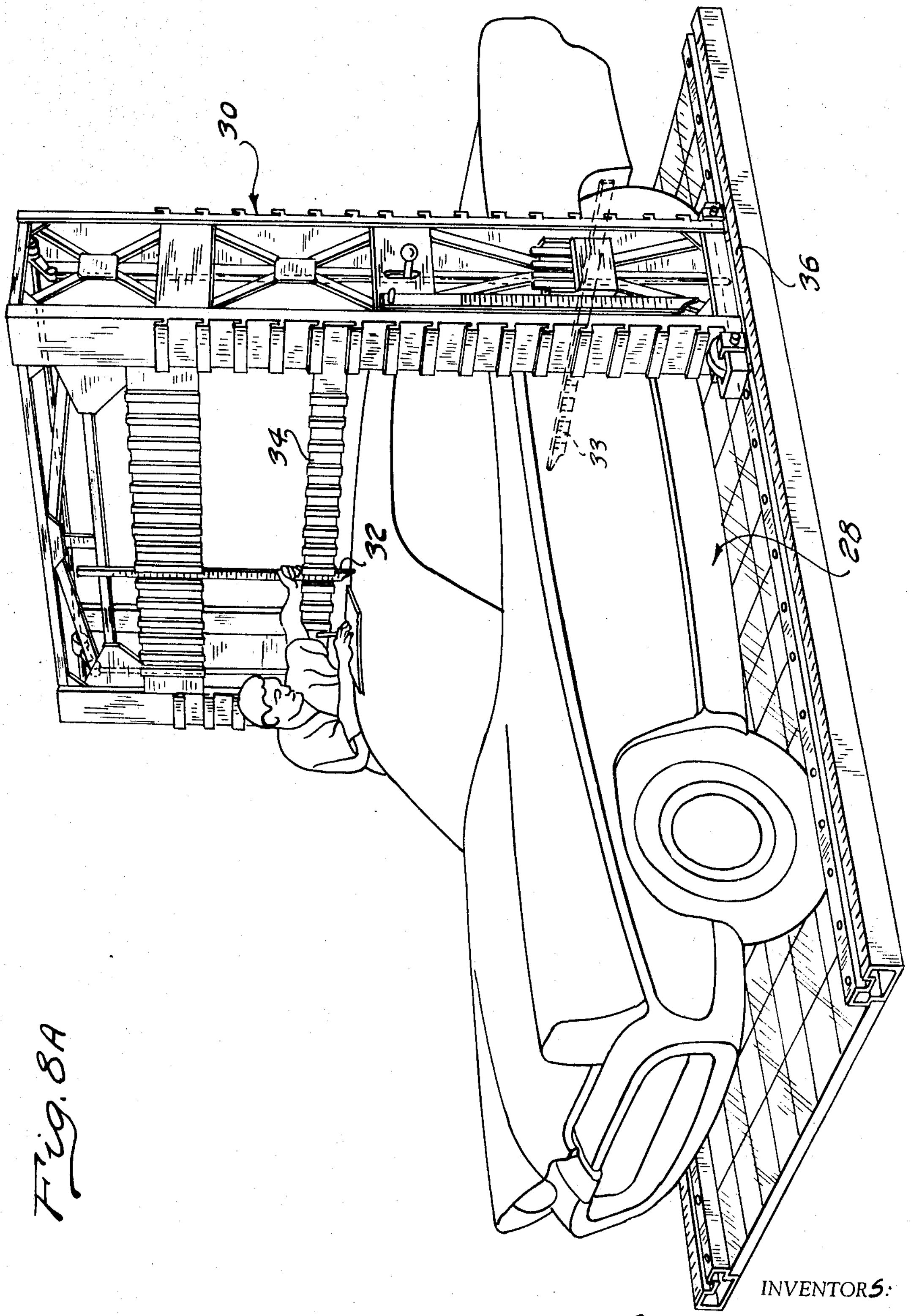
FIGS. 8A and 8B show in isometric form the front and rear of a styling bridge used with a three-dimensional clay model to obtain model surface point data.
Figure 8B:
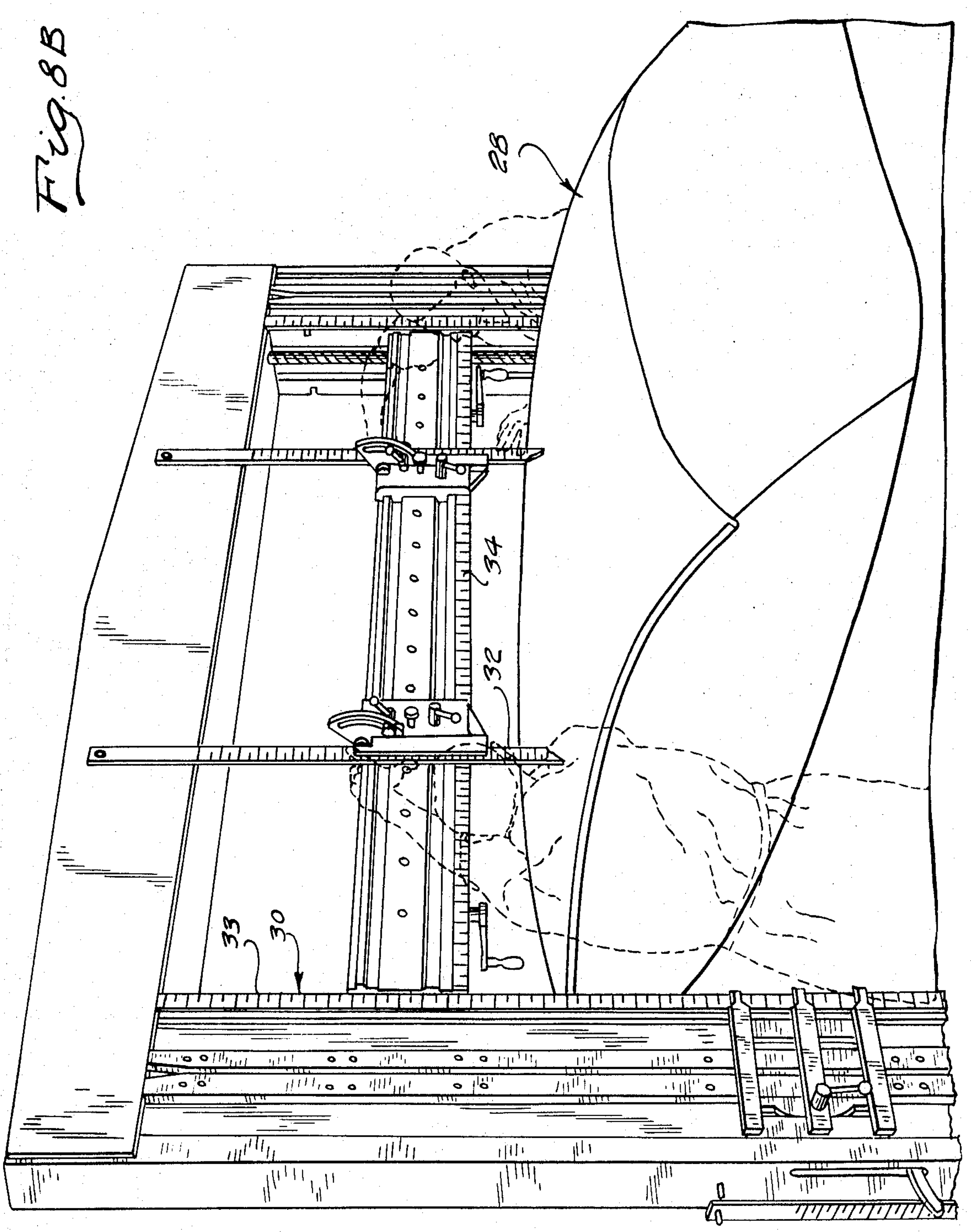
Figure 9A:
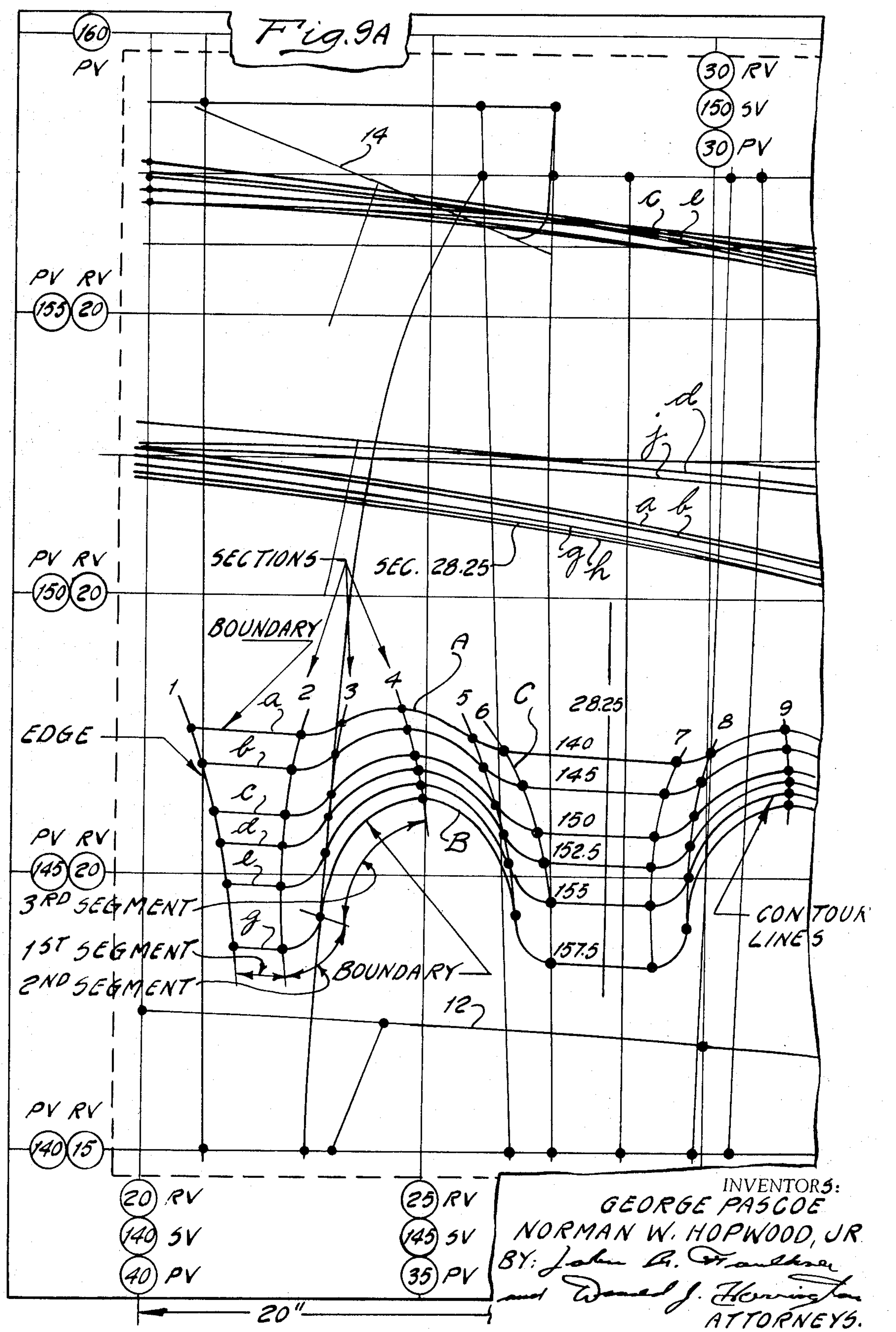
FIGS. 9A and 9B show a body draft plate for a three-dimensional model, such as that shown in FIGS. 8A and 8B, illustrating the principal characteristic lines including the contour lines, the boundary lines, the section lines and the edge lines.
Figure 9B:
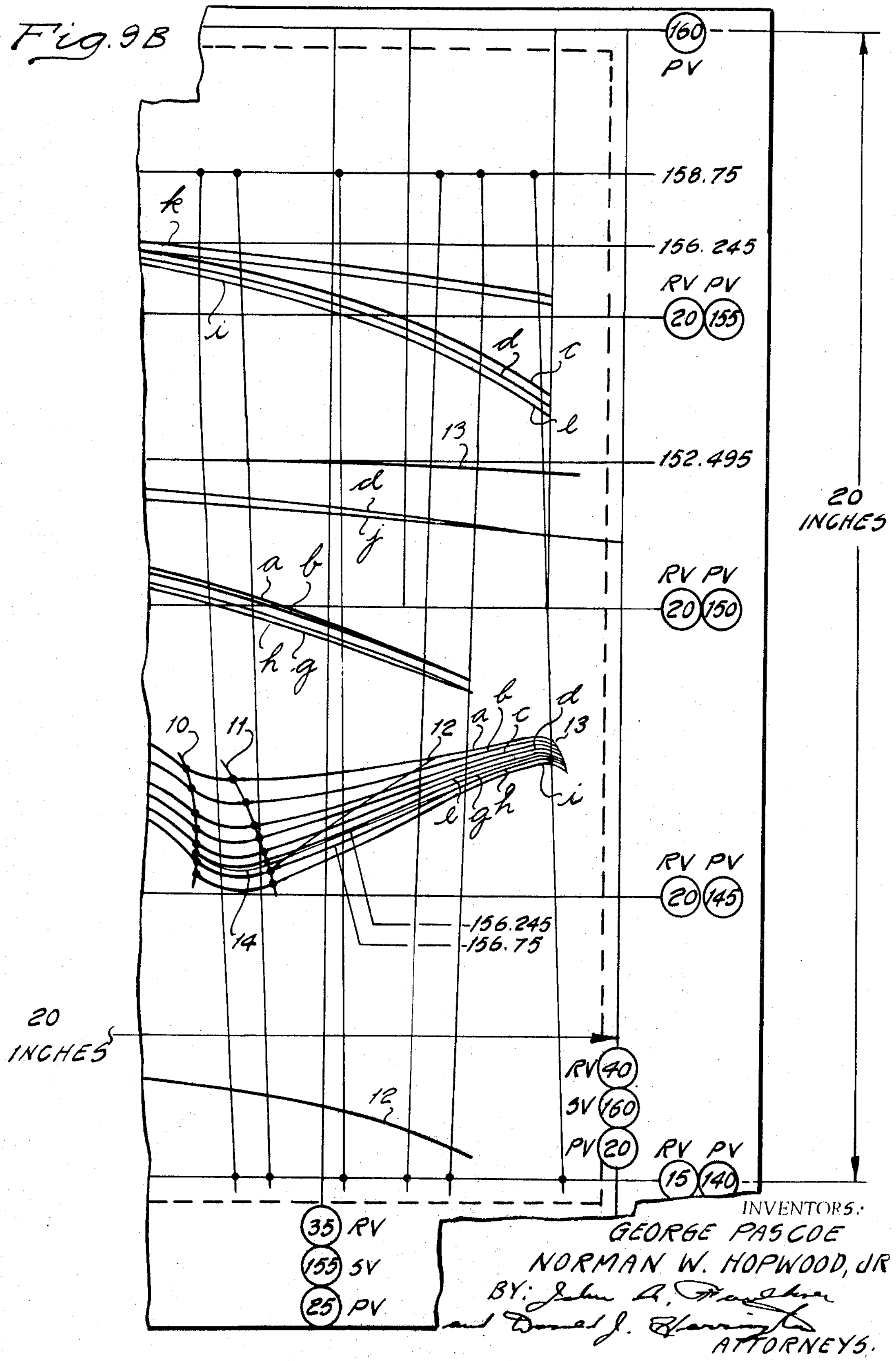

The surface data at section lines and character lines on three-dimensional models are plotted on a two-dimensional body draft from data obtained from a bridge type measuring device, as indicated in FIGS. 8A and 8B, where numeral 28 shows a clay model of a vehicle body. The bridge type measuring device is shown generally at 30. A model engaging, scaled probe 32 contacts a pre-selected section along character lines. The dimensions of various points on these lines are defined in terms of X, Y and Z principal coordinate axes. The vertical dimension is read on a scale 33. The transverse dimension is read on a horizontal transverse scale 34 and the longitudinal dimension of a point is read by a longitudinal scale 36. The bridge moves longitudinally across the model and any number of points desired is read and recorded. These points are plotted on a draft plate, as shown in FIGS. 9A and 9B, where we have shown the two-dimensional data plotted on a section 16′ long by 5′ wide. The boundary lines that are selected break the contour surfaces into zones. These are defined by the segments between tangency lines or the segments between discontinuous surface areas. Two such boundary lines are indicated by the labels A and B in FIG. 9A. The section lines, one of which is shown at C in FIG. 9A, are taken through the contour lines between the boundary lines. A surface development in two dimensions can be used to correct clay model irregularities and to make other modifications in the profile to meet mechanical, structural and functional requirements of the finished body.

The data obtained from the models is used in prior art methods to obtain template contour lines which are traced from the body draft onto thin vellum paper. A reproduction of the tracing is made from which the contour lines are transferred to aluminum sheet stock by prick-punching along the lines into the aluminum. The punch marks in the aluminum stock then are connected by scribed curves and sawed out on a band saw and rough filed as close to the outline as possible. Then the template is manually fitted by hand-filling to the contour lines on the draft and checked out by the draftsman for correctness of fit.

The next step in conventional processes includes wood model consrtuction. To do this wood model blocks are built up in segments which are contour cut to templates in both plan and elevation. Ridges, beads and character lines are made in separate segments and inserted into the main block. Straight line work is done by machine, and contour lines are reproduced by spindle shaping and hand routing.

The final finishing operations are performed by hand. The templates are placed on the model in their respective positions and the wood is removed until the templates form a series of lines. The surface between the template lines is blended in by hand.

Figure 10:
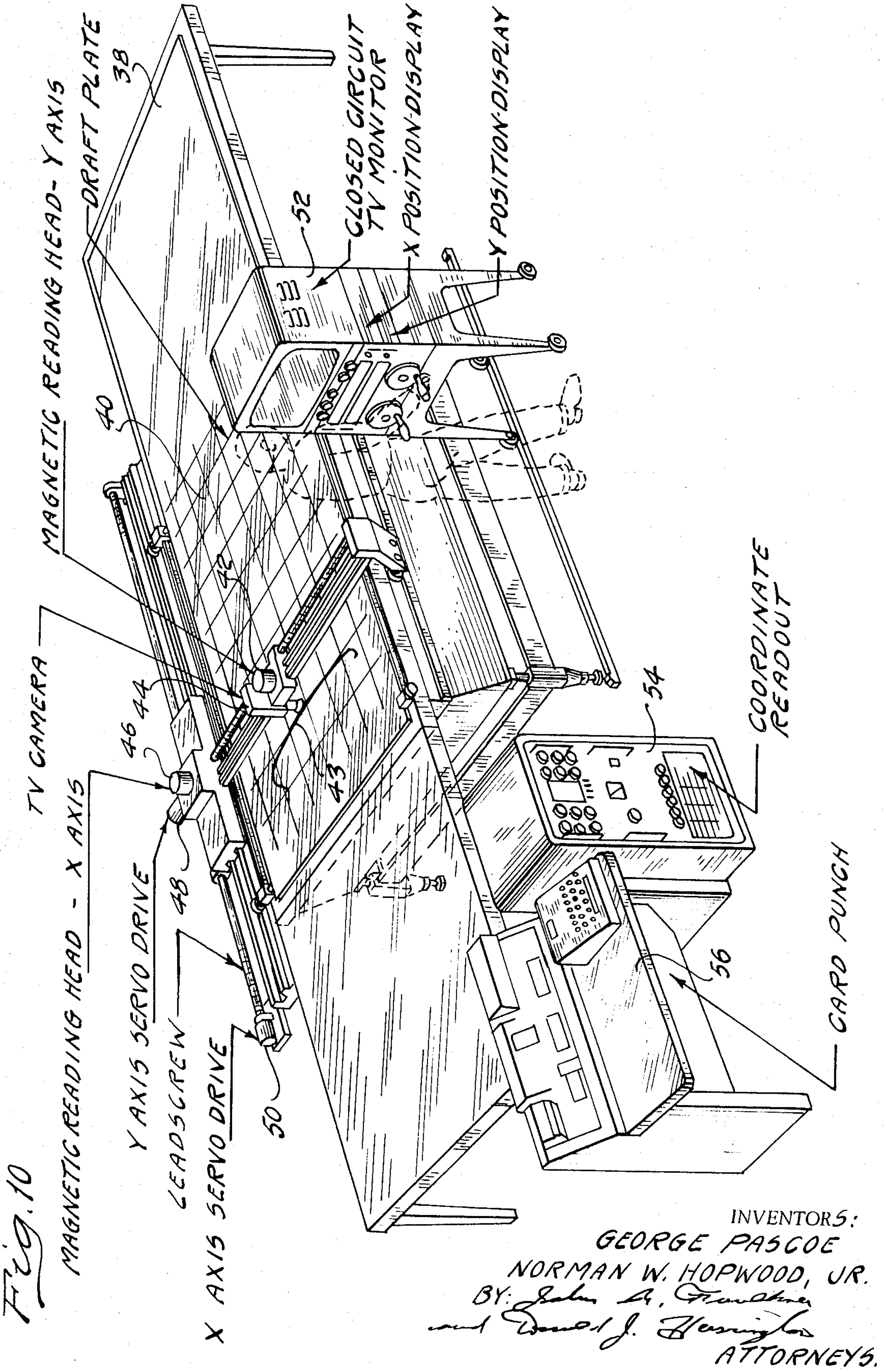
FIG. 10 shows in isometric form a coordinatograph table which has an optical scanner for locating data points on the draft plates of FIGS. 9A and 9B.

In our improved method, in contrast we employ surface data obtained from clay models, and then form a two-dimensional draft plate used with a contour reading system adapted to function in two dimensions—namely, X and Y coordinates. The instrument used to obtain the readings is called a coordinatograph, which is illustrated in FIG. 10. The coordinatograph includes a table 38 for supporting the draft plate 40, a magnetic reading head 42 for obtaining Y axis readings, a TV camera 44 for scanning the draft plate contour lines 43, a magnetic reading head 46 for obtaining X axis readings, a Y axis servo drive 48 for positioning the magnetic reading head 42 in the direction of the Y axis, an X axis servo drive 50 for shifting the magnetic reading head 46 in the direction of the X axis, a closed circuit TV monitor 52 having both X axis display controls and Y axis display controls. A position digitizer 54 for receiving the data obtained by the operator as he records the information received from the TV camera and a card punch assembly 56 for registering the data of the digitizer.

A coordinatograph operator or draftsman receives a set of pre-prepared numerical process sheets and a template information drawing that identifies the lines and zones on the draft plate that are required for data reading. The coordinatograph cards are stacked in the order in which they are punched and are used in further computations with a computer.

As the coordinatograph operator is engaged in data development from the two-dimensional draft, the magnetic pickups generate one impulse for each .0001 inch movement in both the X and Y directions. The impulses are added by an electronic counter and readout unit 54. When the scanner target is located at the desired point on the draft, the operator presses a switch which activates the input circuit for the counter. The counter readings, which are the coordinates of the scanned points, are punched on computer cards by the card punch 56. If it is desired to check the readings of the coordinatograph, the coordinates of the plotted points can be introduced into a high speed plotter. The plotter automatically will reproduce a curve corresponding to the characteristic boundary and section lines of the draft plate. If the resulting curve has extraneous points on it, the plotted points can be located and corrected before the computer punched cards from the card punch machine are introduced into the computer routine. The same cross check can be used at a later stage in the method by introducing the data for the computed points in space, which define the finished cutter path, into a data plotter. The contour that would be followed by the cutter then could be examined on the two-dimensional layout as a check against the accuracy of the three-dimensional data.

Figures 11, 12:
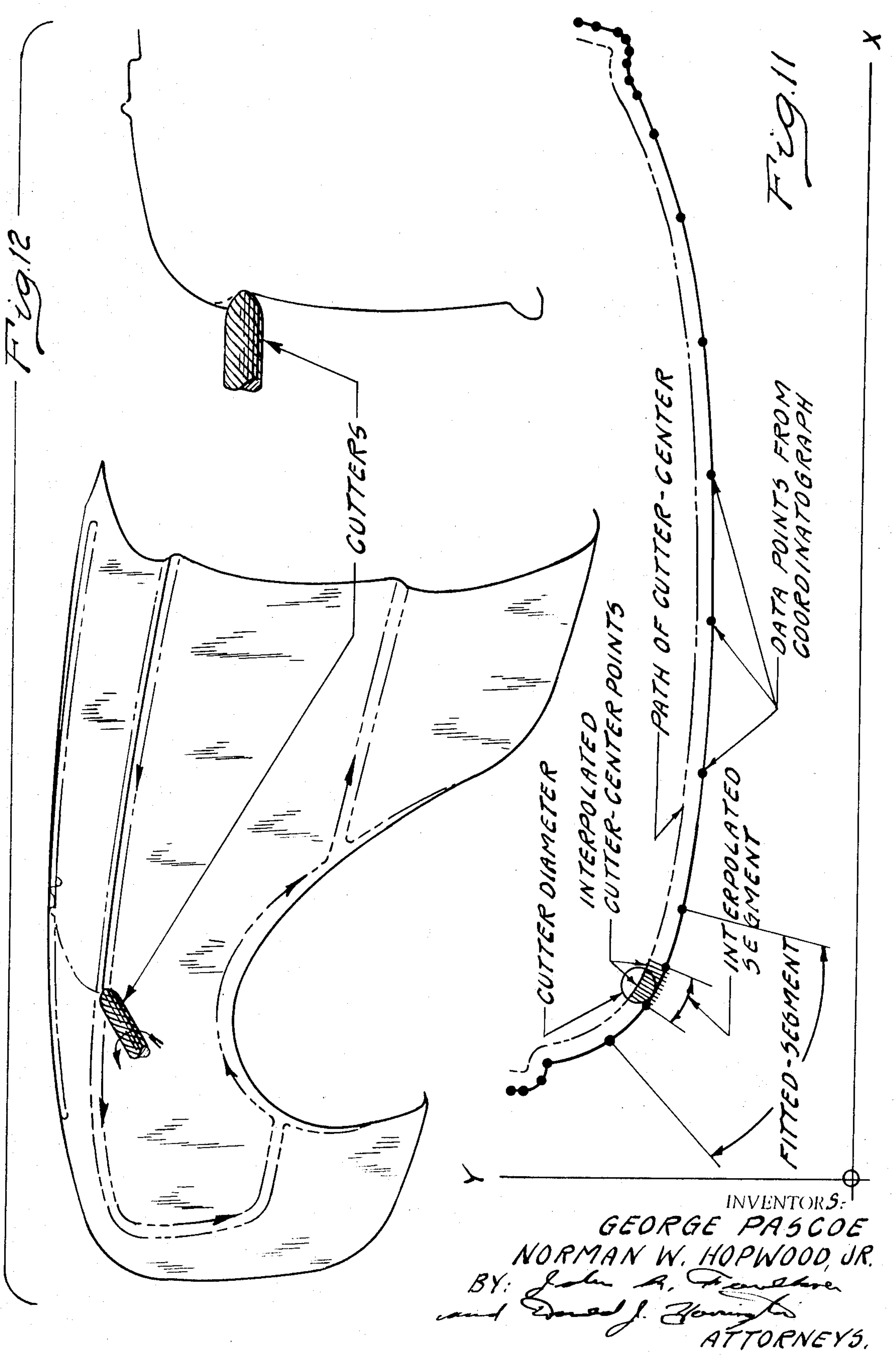
FIG. 11 shows a characteristic line taken from the draft plate of FIGS. 9 and 10, together with typical data points that are scanned by the optical scanner illustrated generally in FIG. 10 as coordinate information is obtained for each point.
FIG. 12 shows schematically a milling cutter positioned against a characteristic contour line of a three-dimensional vehicle body fender die. It indicates the direction and path of movement of the milling cutter during the finish die machining operation.

After the correct coordinatograph readings are obtained, they are transferred into an electronic computer where the point coordinates are fitted into a continuous curve by a method that will be described subsequently. The resulting cutter center path, which is interpolated from the contour data, is shown in FIG. 11 for a typical contour scanned by the coordinatograph.

In continuous path programming for three-dimensional surfaces it is necessary to synchronize the X, Y and Z dimensions as measured from the two-dimensional draft. The contours of most parts to be machined will be composed of sections or combinations of sections of circles, conics and straight lines. Parabolas are fit into sections, and a computer routine is used to produce automatically parabolic arc and chord lengths, which results in a series of points across each section. The points, which are the chords of the parabolas, make up a continuous path. The machine movements are controlled from point to point in response to signal values released in timed sequences for the X, Y and Z coordinates of the points.

The body surface which is developed and interpolated from the sections and projections of character lines from the body draft is considered to be a network of closely spaced points. Each point is defined by its X, Y and Z coordinates and by the direction of a line normal to the surface. The development and interpolation of the surface between the curved lines and cross section is established by a computer routine as will be explained also subsequently. A three-plane offset path for the center of spherical end milling tools thus is generated, thereby enabling the three-axis milling machine to respond to the travel control in all three axes simultaneously and to generate the surface according to its numerical definition. An advantage in this step is that the cuts of the machine tool can be programmed along character lines or in any other direction desired thus making it possible to continuously machine along prominent or critical areas as illustrated in FIG. 12.

Special numerical codes are used for identifying body surfaces and to describe surface contours and profiles. These codes divide the contours and profiles into character lines and zones on the draft plate layout. This marked-up layout then becomes the master information drawing which the coordinatograph operator uses for instructions. This, together with a so-called numerical process sheet, which contains a listing of all necessary lines to be recorded, is all the information that the operator needs.

A right-hand coordinate system is used. This means that the X–Y plane, the Y–Z plane and the X–Z plane are used as the three principal planes to which all the coordinate dimensions are given. The principal coordinate planes are indicated in FIG. 13. When this system is applied to a vehicle body draft, the X, Y and Z coordinate axes are shown as indicated in FIG. 14, where the X axis is drawn in the direction of the rear of the car from the front dash. The Y axis is drawn from the centerline to the right side of the car. The Z axis is drawn from the top of the frame toward the top of the car.

Part surfaces are generally shown on the body draft in three views—side view, plane view and end view. Auxiliary views also can be used if required. These views for numerical processing purposes are defined as planes. They consist of the primary plane, the secondary plane, complementary principal plane, complementary angular plane and compound plane. The principal plane is perpendicular to one of the coordinate axes. Thus an X–Y plane would be a horizontal plane, the X–Z plane would be a frontal plane and the Y–Z plane would be a profile plane.

Figure 16:
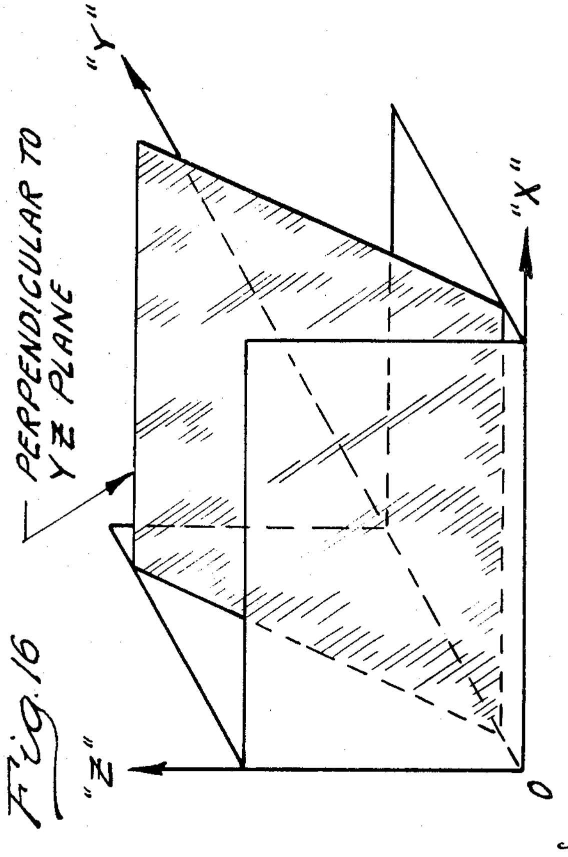

FIGS. 15A and 15B show an example of a general master layout for an automotive vehicle body having these three principal planes. An example of a complementary angular plane is shown in FIG. 16. The location of this plane, which is identified in FIG. 16 as a plane perpendicular to the Y–Z plane, is identified in FIG. 15A by section line 16—16.

Figure 17:
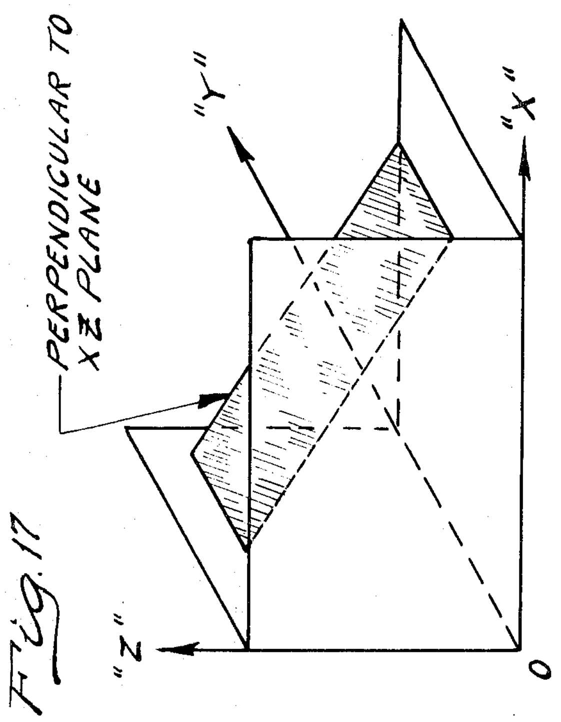

FIG. 17 shows a complementary angular plane, which is perpendicular to the X–Z plane. This angular plane is identified in FIG. 15A by section line 17—17.

Figure 19:
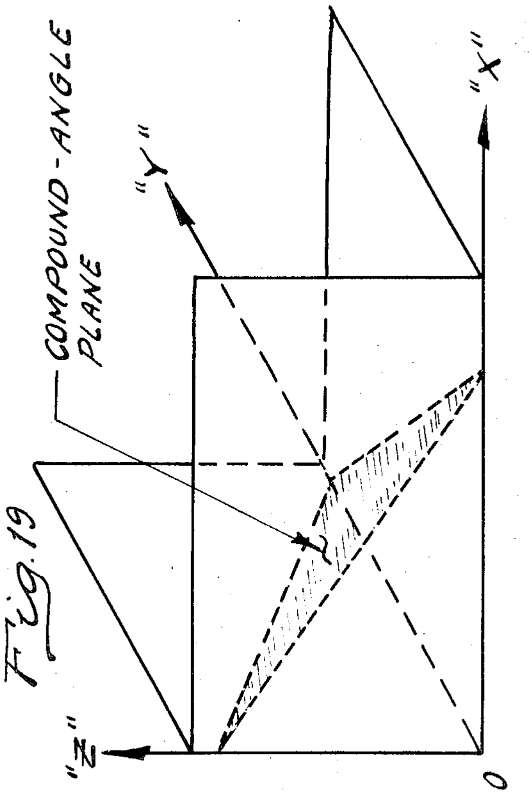
Figure 18:
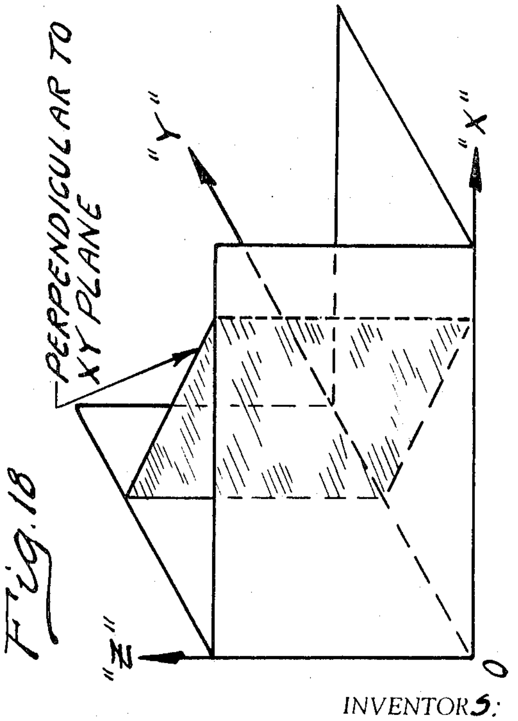

FIG. 18 shows a complementary angular plane that is perpendicular to the X–Y plane. It is identified in FIG. 15A by section line 18—18. A compound angular plane, which is not perpendicular to any of the principal coordinate planes, is shown in FIG. 19. It is located at section 19—19 of FIG. 15A.

All the lines and the zones on the body layout are coded for use in the computer. The lines which define the surface areas must be specified by an appropriate code which consists in our improved method of letters and numbers. If the numbered line begins with the symbol D, it represents a boundary line. The number of the boundary line in series is represented by a numeral following the symbol B. The code symbol E represents an edge line which represents one of the extremities of the zone. The symbol S represents a line at a section that is normal to a coordinate plane. The symbol R identifies a line on a contour surface and the symbol A represents a line on an angular section.

Figure 20:
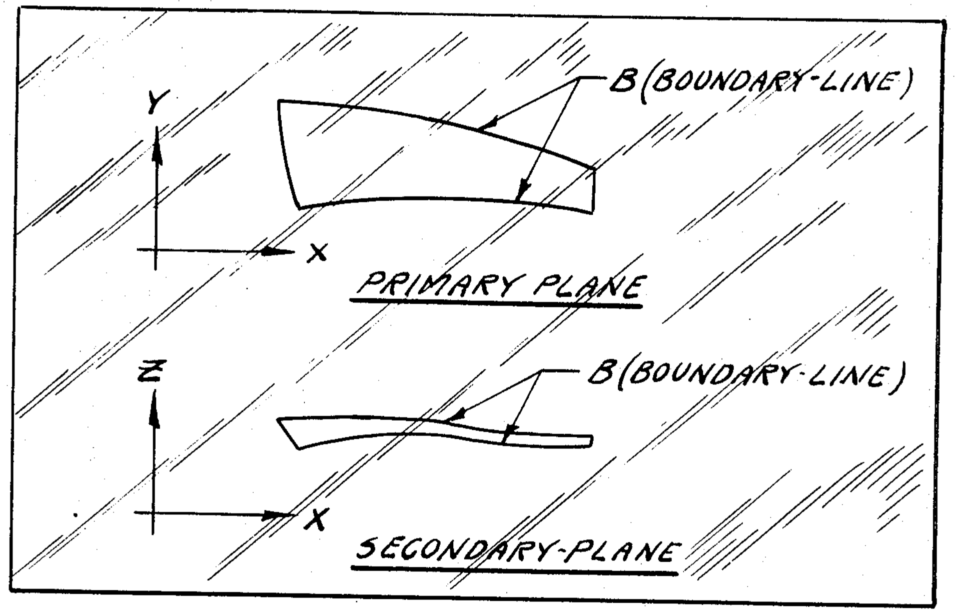
Figure 21:
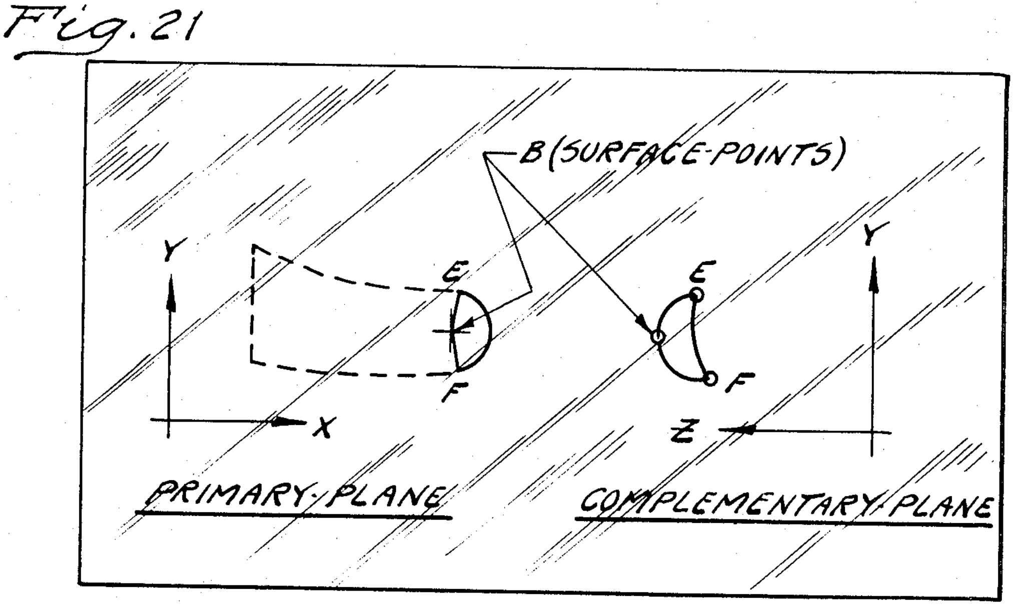
Figure 22:
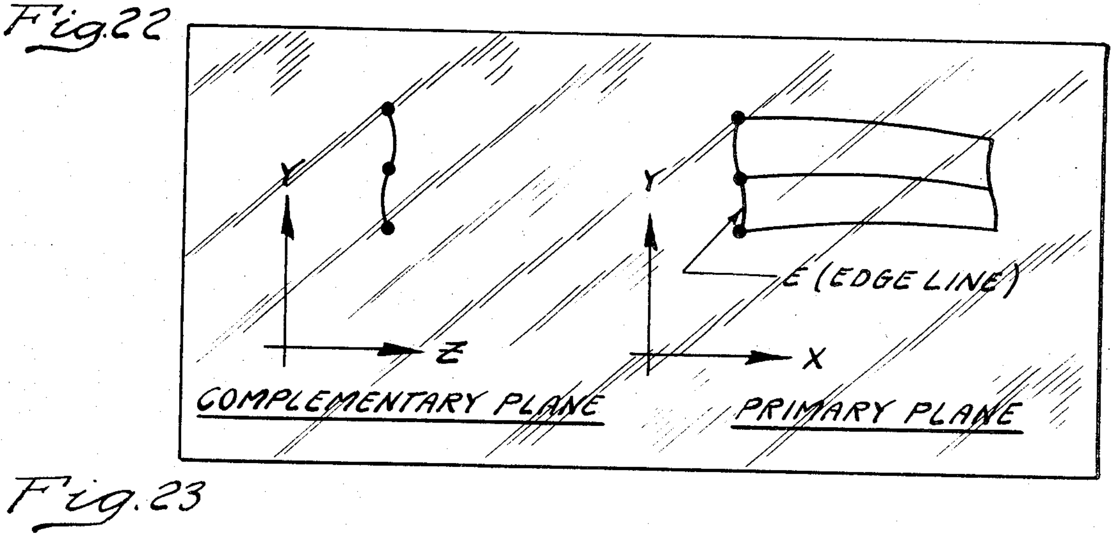
Figure 23:
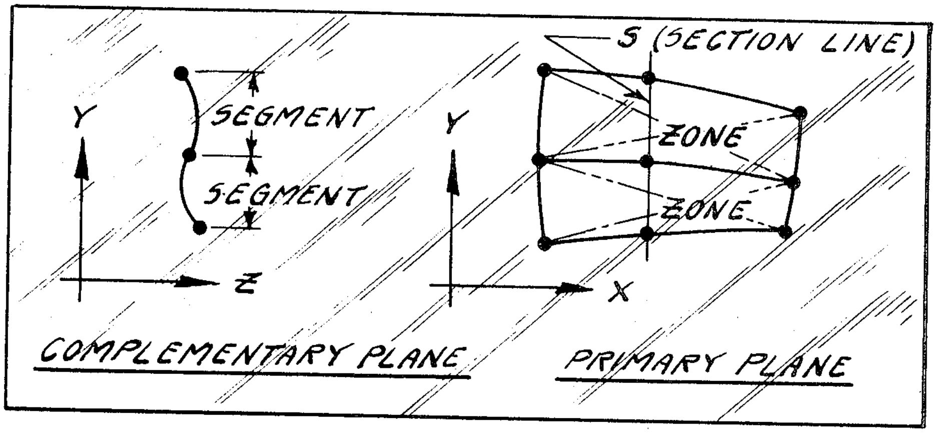
Figure 24:
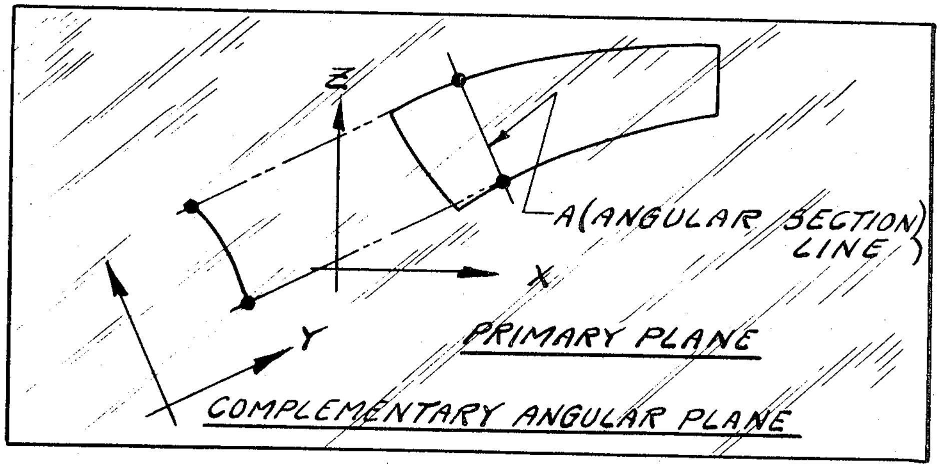

Illustrations of some of the standard type lines are found in FIGS. 20, 21, 22, 23, 24 and 25. FIG. 20, for example, shows a B boundary line, which is defined by two principal planes, primary and secondary. Lines which form or continue the basic character of the part are used as boundary lines. FIG. 21 shows a B–A surface point used as a boundary line such as a center point on the top of a spherical surface. It is defined in X, Y and Z coordinates. FIG. 22 shows an E edge line or segment. It is defined in two principal planes and is used as a section in making up a zone. FIG. 23 shows an S section line which is defined in one principal plane, the complementary plane. It describes a contour, a radius or a straight line. All points on this line lie in one plane. FIG. 24 shows an A angular section line defined in one angular plane, a complementary plane, which is perpendicular to the primary plane.

Figure 25:
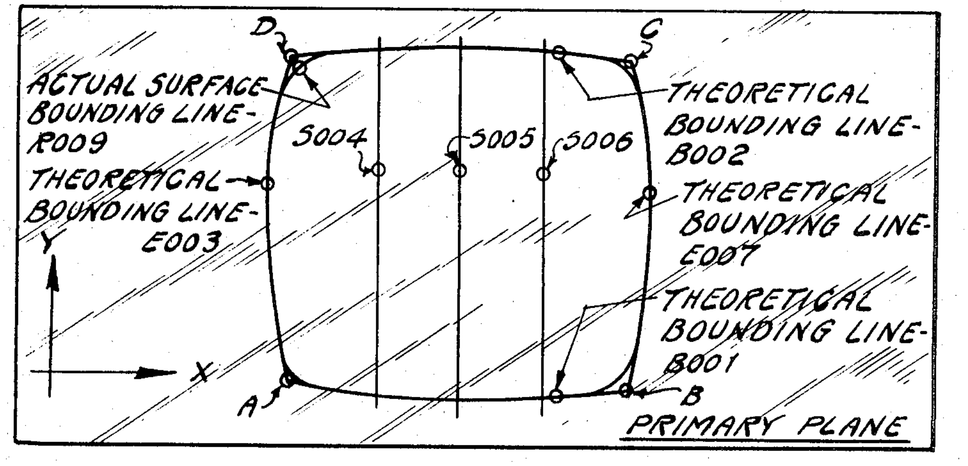

FIG. 25 shows an R contouring line of a surface. It is defined in the primary plane only. The surface is processed to theoretical points A, B, C, D. Line R009 is the actual outline of a part. The lines S004, S005 and S006 define the section lines, the edge lines E007 and E003 define the boundaries of the surface in one direction and the corresponding boundaries in the other direction are defined by the boundary lines B002 and B001. A corresponding identification system can be established for special type lines depending upon the configuration of the part.

Zone identification is established by combinations of boundary lines, edge lines, section lines and special points. These divide the zones into part surfaces. The zones, which are used to determine the cutter path for machining surfaces, will generally follow the character of the part surface. A zone is always bounded by boundary lines on two sides and an edge line or section line on each end. A zone may have two or more section lines but it will not contain more than two boundary lines. If there are any points of inflection in the section lines, a boundary line may be established and another zone described. For example, FIG. 26 shows three zones, the boundaries of which are determined by points of inflection in the boundary lines. In computing surfaces and connecting draft data into numerical data, the contour of each section line is considered to be made up of segments. If the curve of a section changes abruptly, a boundary line should be established and another zone described. An example of this is shown in FIG. 27.

Zones are shown in three planes. A zone's primary plane is the one that generally shows the greatest area of the surface, the location of the section lines on principal planes and the location of the end points of angular sections on boundary lines. A zone's secondary plane usually shows the long dimension of the zone and boundary lines and their relative depth.

FIG. 28 shows a body panel layout drawing in which the zones, the boundary lines and the section lines have been identified in both the primary plane and the secondary plane. As previously explained the two-dimensional contours obtained from the readings of the coordinatograph are transferred into an electronic computer. The point coordinates are fitted into a continuous curve by the computer. This requires a special programming of the computer which will be discussed. It is based upon the premise that a parabolic curve can be passed through any four points that might be located by the coordinatograph operator. Stated in another way, a parametric polynominal curve may be made to pass through any group of at least four scanned points.

In FIG. 29, the points that are located by the coordinatograph operator are identified as points 1, 2, 3 and 4. These points are connected by three chords identified in FIG. 29 by the lines U, W and V. A chordal line T connects the last point with the first point. The zero point for purposes of this computation is at the left-hand side of the view of FIG. 29. It is appropriately labeled. In making a parabolic curve through four points, the equation first can be written in general form for any straight line through a point where the X coordinate equals $b$ and the Y coordinate equals $a$ and the slope at that point is $m$. Such an expression is written as follows:

$$y-a=m(x-b)$$
$$y-a-mx+mb=0$$
$$y-mx-(a-mb)=0$$

Now if we take four given points whose coordinates are $(b, a)$, $(d, c)$, $(f, e)$ and $(h, g)$ respectively, we can write the following equations:

(U) $$y-m_1x-(a-m_1b)=0 \text{ and } m_1=\frac{c-a}{d-b}$$

(W) $$y-m_2x-(c-m_2d)=0 \text{ and } m_2=\frac{e-c}{f-d}$$

(V) $$y-m_3x-(e-m_3f)=0 \text{ and } m_3=\frac{g-e}{h-f}$$

(T) $$y-m_4x-(g-m_4h)=0 \text{ and } m_4=\frac{a-g}{b-h}$$

which are chords joining consecutive pairs of the given points. To form the chord product equation, we can multiply the left-hand sides of pairs of these equations together to yield the Equation CP.

$$(U\times V)+k(W\times T)=0$$

where $k$ is a number to be determined later. It can be shown that Equation CP represents some curve which passes through the original four points. For example, Equation U is satisfied by point $(b, a)$. If we substitute $b$ for $x$ and $a$ for $y$ in Equation U, we have $(a-m_1b)-(a-m_1b)=0$ which is clearly true. Likewise, if we make the same substitution into Equation T, we have $a-m_4b-(g-m_4h)=0$; and, if we substitute $(a-g/b-h)$ for $m_4$, we have $$a-\left(\frac{a-g}{b-h}\right)b-g+\left(\frac{a-g}{b-h}\right)h=0$$

or $$\frac{a(b-h)}{b-h}-\frac{b(a-g)}{b-h}-\frac{g(b-h)}{b-h}+\frac{h(a-g)}{b-h}=0$$

or $$\frac{ab-ah-ab+bg-bg+gh+ah-gh}{b-h}=0$$

or $$\frac{(ab-ab)+(ah-ah)+(bg-bg)+(gh-gh)}{b-h}=0$$

which demonstrates that Equation T is also satisfied by point $(b, a)$. Since at $x=b$, $x=a$ Equation U=0 and Equation T=0, then Equation CP reduces to $(0\times V)+k(W\times 0)=0$ which is true for all values of $k$. In the same fashion, it can be shown that point $(d, c)$ satisfies Equations W and U, point $(f, a)$ satisfies Equations W and V and points $(h, g)$ satisfies Equations V and T. Thus, each of the points satisfies Equation CP which can be considered as the equation of a family of curves all of which pass through the four original points. If a particular value for $k$ is substituted into Equation CP, it then becomes the equation of one specific curve through the four points. In order to simplify Equation CP, we can make the following substitutions. Let $$A=(a-m_1b)$$
$$B=(c-m_2d)$$
$$C=(e-m_3f)$$
$$D=(g-m_4h)$$

and rewrite the Equations U, W, V, and T.

(U) $y-m_1x-A=0$
(W) $y-m_2x-B=0$
(V) $y-m_3x-C=0$
(T) $y-m_4x-D=0$ and Equation CP when expanded becomes:

(CP) $$(y-m_1x-A)(y-m_3x-C)+k(y-m_2x-B)(y-m_4x-D)=0$$

$$y^2-(m_1+m_3)xy+m_1m_3x^2-(C+A)y+(Cm_1+Am_3)x+AC+k[y^2-(m_2+m_4)xy+m_2m_4x^2-(D+B)y+(Dm_2+Bm_4)x+BD]=0$$

or $$[m_1m_3+k(m_2m_4)]x^2-[m_1+m_1+m_3+k(m_2+m_4)]xy+(1+k)y^2+[Cm_1+Am_3+k(Dm_2+Bm_4)]x-[C+A+k(D+B)]y+AC+kBD=0$$

If we make the following substitutions:

$$E=m_1m_3+km_2m_4$$
$$F=-[m_1+m_3+k(m_2+m_4)]$$
$$G=1+k$$
$$H=Cm_1+Am_3+k(Dm_2+Bm_4)$$
$$J=-[C+A+k(D+B]$$
$$L=AC+kBD$$

We have $Ex^2+Fxy+Gy^2+Hx+Jy+L=0$ which is the equation of the general conic curve which may be of the nature of a line, circle, ellipse, hyperbola or parabola. The nature of the curve may be determined by examining the relationship of the coefficients E, F and G. The equation represents a parabola if $F^2-4EG=0$.

By selecting a value for $k$ which will satisfy the condition that $F-4EG=0$, we can insure that the resulting equation represents the required parabola. All the coefficients of our desired equation may be computed by solving for $k$ in the equation:

$$[m_1+m_3+k(m_2+m_4]^2-4(m_1m_3+km_2m_4)(1+k)=0$$

or $$k^2(m_2+m_4)^2+2k(m_1m_2+m_1m_4+m_2m_3+m_3m_4)+(m_1+m_3)^2-4m_1m_3-4k(m_1m_3+m_2m_4)-4k^2m_2m_4=0$$

or $$k^2(m^2{}_2+2m_2m_4+m^2{}_4)-4m_2m_4)+2k(m_1m_2+m_1m_4+m_2m_3+m_3m_4-2m_1m_3-2m_2m_4)+(m^2{}_1+2m_1m_3+m^2{}_3-4m_1m_3)=0$$

or $$k^2(m_2-m_4)^2+2k(m_1m_2-2m_1m_3+m_1m_4+m_2m_3-2m_2m_4+m_3m_4)+(m_1-m_3)^2=0$$

$$k^2(m_2-m_4)^2+2k[(m_2-m_3)(m_1-m_4)+(m_2-m_1)(m_3-m_4)]+(m_1-m_3)^2=0$$

For simplicity let $P=(m_2-m_4)^2$,--

$$Q=2[(m_2-m_3)(m_1-m_4)+(m_2-m_1)(m_3-m_4)]$$

and $$R=(m_1-m_3)^2$$

The equation can then be written:

$$Pk^2+Qk+R=0$$

and $$k=\frac{-Q\pm\sqrt{Q^2-4PR}}{2P}$$

Solution of this last equation yields two values for $k$ each of which if substituted back into the equations for E, F, G, H, J and L will produce coefficients of the equation of a parabola through the four original points. The following example will illustrate the method. It is required to find a parabola through the following points:

| | X | Y |
|---|---|---|
| Point No.: | | |
| 1 | 4.000=b | 2.048=a |
| 2 | 5.000=d | 1.058=c |
| 3 | 6.080=f | .486=e |
| 4 | 7.722=h | 0=g |

$$m_1=\frac{c-a}{d-b}=\frac{1.058-2.048}{5.000-4.000}=\frac{-.990}{1}=-.990000$$

$$m_2=\frac{e-c}{f-d}=\frac{.486-1.058}{6.080-5.000}=\frac{-.572}{1.080}=-.529630$$

$$m_3=\frac{g-e}{h-f}=\frac{0-.486}{7.722-6.080}=\frac{-.486}{1.642}=-.295981$$

$$m_4=\frac{a-g}{b-h}=\frac{2.048-0}{4.000-7.722}=\frac{2.048}{-3.722}=-.550242$$

$$A=(a-m_1b)=2.048-(-.990000)(4.0000)=6.008000$$
$$B=(c-m_2d)=1.058-(-.529630)(5.0000)=3.706150$$
$$C=(e-m_3f)=.486-(-.295981)(6.080)=2.285564$$
$$D=(g-m_4h)=0-(-.550242)(7.722)=4.248969$$
$$E=m_1m_3+km_2m_4=(-.99)(-.295981)+(-.529630)(-.550242)k$$
$$E=.293021+.291425k$$
$$F=-[m_1+m_3+k(m_2+m_4)]=-[(-.99)+(-.295981)+(-.529630-.550242)k]$$
$$F=1.285981+1.079872k$$
$$G=1+k$$
$$H=Cm_1+Am_3+k(Dm_2+Bm_4)$$
$$=(2.285564)(-.99)+(6.008)(-.295981)+[(4.248969)(-.529630)+(3.70615)(-.550242)]k$$
$$H=-4.040962-4.289661k$$
$$J=-[C+A+k(D+B)]=-[2.285564+6.008+(4.248969+3.706150)k]$$
$$J=-8.293564-7.955119k$$
$$L=AC+kBD=(6.008)(2.285564)+(3.706150)(4.248969)k$$
$$L=13.731669+15.747316k$$
$$P=(m_2-m_4)^2=(-.529630+.550242)^2=(.020612)^2=.00042485$$
$$Q=2[(m_2-m_3)(m_1-m_4)+(m_2-m_1)(m_3-m_4)]$$
$$=2[(-.529630+.295981)(-.99+.550242)+(.-529630+.99)(-.295981+.550242)]$$
$$=2[(-.233649)(-.439758)+(.460370)(.254261)]$$
$$Q=.43960631$$
$$R=(m_1-m_3)^2=(-.99+.295981)^2=(-.694019)^2=.48166237$$

$$k=\frac{-Q\pm\sqrt{Q^2-4PR}}{2P}$$

$$=\frac{-.43960631\pm\sqrt{(.43960631)^2-4(.00042485)(.48166237)}}{2(.00042485)}$$

$$=\frac{-.43960631\pm\sqrt{.19243517}}{.00084970}=\frac{-.4396061\pm.43867433}{.00084970}$$

$$k=-1.096822$$

or $$k=-1033.636142$$

Although either of these values for $k$ may be used to produce the equation of a parabola through the given points, experience has shown that a value close to $-1$ is preferable for the fitting of smooth curves through points.

We can then find the coefficients of the desired equation by substituting $-1.096822$ for $k$ in the equation for E, F, G, H, J and L. The results of the substitution are:

$$E=.293021+.291425(-1.096822)=-.026620$$
$$F=1.285981+1.079872(-1.096822)=+.101554$$
$$G=1+(-1.096822)=-.096822$$
$$H=-4.040962-4.289661(-1.096822=+.664033$$
$$J=-8.293564-7.955119(-1.096822)=+.431786$$
$$L=13.731669+15.747316(-1.096822)=3.540334$$

and the equation of the required parabola is:

$$-.026620x^2+.101554xy-.096822y^2+.664033x+.431786y-3.540334=0$$

The parabola, which will pass through the four points identified in FIG. 29, is indicated in FIG. 29 by the parabolic second order equation with the coefficients for each of the variables determined. This equation is introduced into the computer, and the computer is programmed to provide thereafter any point along the curve which contains the four points 1, 2, 3 and 4. Any desired number of points intermediate the measured points then can be determined without the necessity for carrying out lengthy, time-consuming, manual operations. When points are interpolated at suitably close increments, the continuous curve of FIG. 11 is determined.

Corresponding cutter center positions are computed and punched out on cards during the post-processing stage as explained previously. The computer output at this stage can be used, if desired, to machine templates and other two-dimensional contours. They can be made to conform closely to the original draft contours without any hand fitting. We contemplate, however, that the data obtained for computing the FIG. 11 contour can be used as a building block for determining the three-dimensional profiles which, like the two-dimensional draft, require the body draft as a basis for obtaining data. This is done by fitting curves to draft contour input points and by interpolating for intermediate points. 1his procedure is the same as described above for computing contours in the case of FIG. 11. This represents the first step in the so-called "point normal slopes" method for defining three-dimensional body surfaces and cutter paths.

This curve fitting process is carried out for both section lines and boundary lines which are scanned by the coordinatograph operator. After having defined the desired parabolic equation, interpolations are made with the aid of a computer which receives the parabolic equation so that points are obtained at close intervals to produce a smooth contour.

In FIG. 30 we have illustrated a sample part shown in end view. This represents one zone of a computed surface. In the bottom view of FIG. 32 of the zone of FIG. 30, the boundary lines are shown at AF, DF and AR, DR. By using the curve fitting method previously described, points between the two end points AR and DR and between the two end points AF and DF can be computed at uniform X axis increments where the X coordinate is measured from left to right.

It will be assumed that the bottom view of FIG. 32 is measured in the principal XY plane. Thus, in the view of FIG. 32, the X, Y and Z coordinates of points $P_1F$, $P_2F$, BF and CF, etc. are interpolated along the boundary line AF, DF. In a similar fashion the intermediate points P1R, P2R, P3R, BR, DR, etc. are interpolated at equal X axis increments along the boundary line AR, DR.

FIG. 31 is a side view of the zone of FIG. 30. FIG. 33 is a view showing the chord heights for the points P18, P28, B8 and C8 which are seen in FIG. 30. The plane in which the chord heights are located in FIG. 33 is not a true section, but it has been illustrated as though it were a true section for purposes of this description. In each instance the chord heights for the points A8, P18, P28, B8, C8 and D8 are identified in FIG. 33 by the legends HA8, HP18, HP28, HB8, HC8 and HD8.

The next step involves the computation of the chord heights and the intersection points on given sections. Reference should be made at this time to FIG. 34 as well as FIG. 30. As can be seen in FIG. 34, the coordinates of the end points AF and AR from FIG. 32 are connected by a chordal line. The slope of the chord, tangent $\theta$, is computed as well as the equation of the line through the points. This involves a simple mathematical computation. The midpoint on the chordal line, namely, point MA8, then is computed as well as the slope of a perpendicular bisector through the point MA8. The equation of that perpendicular bisector is determined by a simple calculation. The midpoint determined by the intersection of the perpendicular bisector and the arc is shown at A8. This is the midpoint of sixteen computed points along the arc at section A shown in FIG. 30. The corresponding points for the section B, C and D carry similar notations. In each case the points are numbered consecutively beginning with the points AF, BF, CF and DF and ending respectively at points AR, BR, CR and DR.

Since the equation for the curve at section A is determined by the previously described curve fitting method, the coordinates of equidistantly spaced points along the curve can be readily found with a computer. In this case there are sixteen such points. The two points that are nearest to the line HA8, which is a perpendicular bisector through the point MA8, are identified. These are points AT1 and AT2 in FIG. 34. Since the coordinates of these two points are known, the equation of the line passing through the points can readily be determined. The intersection between the chordal line drawn through the points AT1 and AT2, the equation of which is determined as previously described, and the line HA8 then is computed. This also involves a simple mathematical computation with the aid of a computer since the equation of line HA8 and the equation of the chord are known. The coordinates that satisfy the equations of both lines thus will be the intersection point. Since this point at the intersection is very close to the contour line, it is considered as part of the contour since the error is slight.

The distance of the chord height along the line HA8 now is computed. This is a simple mathematical carculation since it simply involves determining the distance between two fixed points, the coordinates of which are known. This distance then is converted to absolute coordinates.

The next step in this process involves the use of the newly computed point A8 as an end point rather than as a midpoint. The same steps previously described then are followed again. In other words a new chordal line is drawn through the new end points AF and A8. The midpoint MA4 of that chordal line is determined as before. A perpendicular bisector is drawn through the point MA4. Finally the chord height along that perpendicular bisector HA4 is determined just as the chord height along the bisector HA8 was determined.

The process is repeated once more, but the point AF and newly computed point A4 now are considered to be end points. Another perpendicular bisector is drawn through a new chordal line connecting the points AF and A4. In this way the midpoint A2 for the portion of the arc between AF and A4 is determined. Again the absolute coordinates of each of the midpoints is determined as before. These steps are repeated in the same fashion until the chord length which results is less than a predetermined maximum. By preference this maximum is approximately .100 inch.

In an alternate method for computing chord height and intersection points on given sections, which would be used instead of the chord bisect method described in the foregoing paragraphs, reference will be made to the same FIGS. 30, 31 32 and 33 in addition to FIG. 35 and FIG. 36.

In FIG. 35 there is shown a zone of a part having a surface with a smooth arbitrary profile. It includes two boundary lines 38 and 40, an edge line 42, another edge line 44 and two section lines 46 and 48. It will be assumed that section line 46 is located at a section that corresponds to section A previously described with reference to FIG. 30. The end points for that section are identified by points AF′ and AR′, which correspond to the nomenclature used in FIG. 30. The end view of section 35 is shown in FIG. 36. The end points A′F and A′R thus can be used to determine the equation of the chordal line connecting them. This line then is divided into thirteen equally spaced segements. Again, since the computer stores in its memory the equation of the line extending from A′F to A′R, the coordinates of each of the equally spaced points along the line can readily be determined. Thus is possible to construct a perpendicular bisector extending from the line A′F–A′R at each of these equally spaced points. Further, since the equation of the arc extending from A′F to A′R is known, intermediate points along the arc can be identified in terms of X, Y and Z coordinates. The two interpolated points shown in FIG. 36 at AT′2 and AT′1 are located nearest the perpendicular bisector 51. Since the coordinates of both of these points are known, the equation of the chordal line drawn between them can readily be determined. Having found the equation of that chordal line, its intersection with the perpendicular bisector 51 also can be determined. This is done by identifying the point which satisfies both equations in terms of X, Y and Z coordinates.

The distance between the point 52 on the chordal line A′F, A′R and the point at the intersection of the perpendicular bisector 51 and the chordal line AT′2 and AT′1 then is determined. That intersection point, incidentally, is considered to be a point on the arc extending between A′F and A′R since the error in making this assumption is very slight.

The next step in this process involves a reconstruction of the chord heights in a rectified view such as that shown in FIG. 33. In this view the baseline for the chords is a line corresponding to the line MA8, MD8 shown in FIG. 30. That line, however, is projected on a reference plane XY since the actual line MA8, MD8 of FIG. 30 does not lie in a single plane which can be rotated and used as a reference point. For this reason only the projections of the points on that line appear in the so-called rectified view of FIG. 33. The baseline in FIG. 33 is used for reference purposes as the X axis. The various points along that line are points of intersection between the perpendicular bisectors extending from the previously described midpoints of the arcs of each of the sections and the line between the points MA8 and MD8 which is the baseline through the chord midpoints. We therefore have points in space at this stage of the process. By using the previously described curve fitting method where a parabolic curve is fitted through four points, the equation of the line drawn through the points A8, P18, P28, B8, C8 and D8 shown in FIG. 33 can be computed. In doing this, four points along the line are used as points on a parabolic arc. The equation of that parabolic arc is introduced into the computer memory. The next four points involve points that are common to the previously computed set of four points. A new parabolic curve is fitted through those four points. In a similar fashion the next group of four points through which a parabolic curve is fitted includes at least one of the points of the previous group of four points. This process is continued throughout the extent of the line A8–D8. With this information any number of points between the points A8 and D8 along the constructed line can be determined and the X, Y and Z coordinates thereof can be established.

A variation of this routine can be used if desired where one of the points in the curve fitting process is an end point such as A8 or D8. In this case a circle is fitted through the point A8 or D8 and two adjacent points. The computer therefore receives the equation of a circle that will contain the point A8, for example, and its next two adjacent points instead of receiving at that region an equation of a parabola. The next group of points, however, will consist of four points which are fitted with a parabolic curve as explained previously. This sequence is followed until the next end point is reached. At that time that end point, together with its two adjacent points, is curve-fitted with a circular curve instead of a parabolic curve. But regardless of which sub-routine is followed, the equation of the curve extending from A8 to D8 is clearly established, and any point along the curve can be identified in terms of X, Y and Z coordinates.

The next step is to determine the chord heights at equally spaced points along the baseline MA8–MD8. These points are spaced at equal X axis increments. In one operating embodiment the value of the increments can be equal to .100 inch. The chord height at each of these points then is computed since the chord heights of the points at each end of the chord are known. For example, in FIG. 33, the chord heights HP18 and HP28, which are located at equally spaced X axis increments from the point MA8, can be computed since both the points P18 and MP18 as well as the next set of points P28 and MP28 are known. They are known, of course, since the equation of the lines on which they fall has previously been computed, as explained previously.

The same procedure described with reference to the midpoint is followed also with reference to the other surface lines such as those passing through point A4, D4 in FIG. 30. The coordinates of the points along the section lines, two of which are the points A4 and D4, are known since the equations of the arcs themselves previously were determined by the curve fitting method. Thus, a predetermined number of points can be established. The determination of these points can be made by finding the chord heights extending from points at uniform increments along the baseline. In the alternative the baseline can be divided into a desired number of segments without reference to the X axis increments between them. This is a preferred method since it is possible by doing this to obtain an odd number of points along each of the arcs at the various sections. These points, which ultimately will fall on the milling tool cutter path as will be explained later, will be introduced into a control tape which in turn will control the operation of the milling cutter.

The cutter includes an automatic parabolic interpolater that requires the simultaneous definition of three coordinate points. Having received the three coordinate points in its control system, the milling cutter, which is of well known construction, will direct the cutter tool to machine a surface through the three points along a parabolic arc rather than along straight line segments between the points. Since the milling cutter requires three points, an odd number of flow lines or cutter path lines is desired rather than an even number. This feature is of significance when the cutter paths are run transverse to the direction of the line A8, D8 shown in FIG. 30. The option of using transverse cutter path directions as well as cutter path directions determined by the direction of the line A8, D8 improves the flexibility of the system.

The boundary lines shown for example in FIG. 32 at AR, DR and at AF, EF are divided into the desired number of segments. Alternatively, these lines can be divided into segments that are of a predetermined segmental length, but this usually is not used where a parabolic interpolater milling cutter is used. Instead, the boundary lines are divided into equal segments which will produce the approximately correct spacing between the points. By preference the spacing should be about .100 inch. The preferred method, for purposes of this description, can be described as the "chord-division" method. Thus the points P1F, P2F, etc. can be expressed in terms of X, Y and Z coordinates since the equations of the boundary lines are known. The same is true for points P1R, P2R, P3R, etc.

The final surface is defined numerically by the coordinates of the points that represent the end of all the interpolated chord heights. To find these points the X, Y and Z coordinates of each of the points P1R, P2R, P3R, etc. and each of the points P1F, P2F, P3F, etc. along the boundary line AF–DF, chords are drawn between point P1R and P1F, between point P2R and P2F, between point P3R and P3F, etc. as indicated in FIG. 30. The midpoint for each of the points is determined. Two of these points are shown at MP18 and MP28 in FIG. 30.

In FIG. 37 this midpoint can be identified by reference coordinates. Also its slope, tangent $\theta$, can be determined readily as seen in FIG. 34. Thus the coordinates of P1F and P1R are known. The equation and the slope of the perpendicular bisector passing through the point MP18 thus can be determined readily. The slope simply is the complement of the angle $\theta$ that is computed.

The value of the chord height obtained previously and as represented in FIG. 33 then can be constructed along the perpendicular bisector P18 in FIG. 37 passing through the point MP18. Having introduced the chord height, it is a simple matter to establish with X, Y and Z coordinates the surface point P18 and to locate it exactly in the space relative to the midpoint MP18. Then the coordinates of the point P18 can be converted to absolute coordinates, which define the location of the surface points with respect to coordinate axes and not with respect to a so-called rectified view such as that shown in FIG. 33.

A chordal line then is drawn, as viewed in FIG. 37, from point P18, as computed, to the point P1R which already is known. The perpendicular bisector is drawn from the midpoint of that chordal line as indicated. The chord height computed with reference to FIG. 33 at the point P112 then is laid off on the perpendicular bisector in order to establish the coordinates of the point P112 with respect to its midpoint. Again, after this is known the coordinates are converted into absolute coordinates with respect to the three principal coordinate planes. The same procedure is followed for locating point P14.

In other words, another chord is drawn from P1F to P18. Again a perpendicular bisector is constructed through the midpoint of the chord P1F, P18 and the chord length previously determined with reference to FIG. 33 is laid off on that perpendicular bisector. This then locates the point P14 as seen in FIG. 37 with respect to the midpoint of the chord. This having been determined, the absolute coordinates of the point P14 are determined.

The surface thus is determined by the coordinates of all the surface points computed in this fashion.

The previous sub-routine is identified as a chord-bisect routine. It is possible, however, to use instead of that method a chord division sub-routine for locating in space the surface points. As in the previous sub-routine, the coordinates of the interpolated points on the boundary line AF, DF and the boundary line AR, DR are established and the corresponding points in each boundary line then are connected with the chord. That chord is divided into a pre-established number of uniform increments.

Similarly the boundary lines themselves are divided into a pre-established number of uniform increments. The number of increments used is an odd number, for the reasons previously described, if the milling machine to be used in the cutting process has a three-point parabolic interpolater. Having thus determined the points along the various chords connecting corresponding points in each boundary line, the slope and the equation of a perpendicular line drawn through each of these chordal increments is computed readily. This is done, of course, since two points along the line are known. A simple mathematical computation similar to that used in the chord product method analysis in the preceding portion of this specification can be used at this stage. Having the equation of that perpendicular line, its intersection with the previously computed arc through the same boundary line points can be defined. This is done simply by finding the coordinates that would satisfy both the equation of the perpendicular line and the equation of the curve of the arc.

This same process is repeated for other interpolated chord height values on the same section. As in the previous sub-routine the coordinates of the surface points can be established simply by referring the computed or interpolated chord heights from FIG. 33 at the appropriate point on the curve of arc A8–D8 to the perpendicular line joining the end points of the section under consideration.

Reference can be made to FIGS. 38 and 39 for an illustration of the perpendicular line drawn through a chord extending from some point P1F on the boundary line AF, DF and the point P1R on the other boundary line AR, DR. The end of that line, which corresponds to the computed chord height from FIG. 33, represents the coordinates of that point in space.

For each of these computed points in space, except for the end points, computations are made to determine the slope at each of two surface points at each side of the point under consideration. For example, in FIG. 41 the point under consideration is point A. The two points along each section line on either side of point A are the points E and D. The coordinates of those two points are known. It is possible, therefore, to establish the slope of a parabolic curve passing through those points simply by taking the partial derivative of the curve at point A. This establishes a tangent vector which is represented in FIG. 39 by reference character 50. This slope is illustrated in FIG. 41 by the sector having an angle $\alpha$. The surface of FIG. 41, incidentally, is the portion of the zone enclosed by a circle. It is shown in FIG. 40. It has been enlarged for purposes of this explanation as FIG. 41.

In a similar fashion the slope which is represented in FIG. 41 by the shaded sector, $\beta$, is determined. This is done by entering into the computer the coordinates for adjacent points B and C, as well as the point A. Having these three points established in terms of X, Y and Z coordinates, it is possible then to determine the partial derivative of the curve at the point A. This represents the tangent vector.

In FIG. 42 we have illustrated the slope of the tangent vector at the point A8, which corresponds to point A of FIG. 41, by the angle $\alpha_{A8}$. The same procedure is followed for all the other points on the surface grid. For the end points, however, a modification of this procedure is followed. One end point is indicated in FIG. 42 at AF. In that case the point AF, together with the two adjacent points A1 and A2, are made to fall on a circle the equation of which can be computed readily when the coordinates of the three points are known. the slope $\alpha_{AF}$ can be determined readily simply by using the previously described partial derivative method to obtain a tangent vector to the circle at the point AF.

Thus two intersecting tangent vectors can be determined for each point as illustrated in FIG. 43. The tangent vectors are identified there as tangent vector B and tangent vector A. By taking the cross-product of those tangent vectors, a unit normal vector can be determined. The cross-product, which is represented as A x B, is made up of vector components. The principal planes of the components can be identified as I, J and K components. The projections of those components on the principal plane are $i$, $j$ and $k$. These can be written as follows:

$$i=I\sqrt{i^2+j^2+k^2}$$

$$j=J\sqrt{i^2+j^2+k^2}$$

$$k=K\sqrt{i^2+j^2+o^2}$$

The unit normal vector now is established. If the radius of the cutting tool is known, it simply is necessary to determine the offset cutter path and to multiply the radius of the cutter by the $i$, $j$, $k$ component. If R=the radius of the cutter, then the X, Y and Z components of the cutter radius, which represent a point in space on a plane through which the cutter center passes, are represented as follows:

$$X_C=X_S+R_i$$

$$Y_C=Y_S+R_j$$

$$Z_C=Z_S+R_k$$

where $X_S$, $Y_S$ and $Z_S$ equal the coordinates of any given point in space.

All of the information on each of the surface points thus is received by the computer which registers it in its memory storage. The output from that computer is transferred then to a computer which converts the information to a well-known magnetic tape. A commercially available tape punch attachment then operates with the magnetic tape input to produce the punched tape output containing the necessary intelligence for directing the milling machine tool. This punched tape is of the form previously described.

Having thus described a preferred manufacturing method for developing contours in three-dimensional surfaces, what we claim and desire to secure by U.S. Letters Patent is:

1. A method for producing contoured profiles with an automatic machine tool cutter comprising the steps of preparing a three-dimensional model containing contours of the part that is desired, mounting said model in predetermined disposition with respect to model surface contacting probes which in turn are carried by measuring structure for movement along principal coordinate axes, measuring the coordinate data for selected points on character lines on said model, recording the coordinates of points on the surface of said model at pre-established character and section lines within a zone defined in part by two boundary lines and by two edge lines, preparing a two-dimensional layout draft of the model data measured, recording the data of characteristic points on said boundary and character lines on said draft, measuring the coordinates of characteristic points along a curve contour extending through said measured points, registering said coordinates in a counter and readout unit and entering the resulting data on an intelligence storing medium, computing the equation of a parametric polynomial curve extending through a group of at least four points measured on said contour, computing the equation of a parametric polynomial curve through an adjacent group of at least four points measured along said contour with at least one of the points of each group being common, entering the resulting equation for each group of points in a computer memory storage system thereby determining by interpolation the coordinates of any point along said contour intermediate the measured points, entering the data that it computed on intelligence storing tape and entering said intelligence storing tape into the control system for said cutter whereby a numerically controlled machined part can be obtained.

2. The method set forth in claim 1 wherein the interpolated contours obtained from the draft point data at the ends of said contours are computed by passing a circle through three adjacent points including the end points at each of said boundary lines and determining the equation of said circle whereby any point intermediate said measured points can be determined by establishing its principal coordinate axes.

3. A method for preparing three-dimensional surfaces by means of a multiple axis milling machine comprising the steps of preparing a model of the finished surface that is desired, mounting said model in a data measuring structure having point coordinate pickup elements situated on three predetermined principal axes, measuring the coordinates of points on the surface of said model along characteristic lines, along section lines spaced at predetermined intervals, along boundary lines for a zone of a surface and along the edge lines which intersect said boundary lines, transferring the data of said measured points on a two-dimensional draft, measuring points along contoured lines plotted on said draft in two dimensions which represent the three-dimensional model on predetermined planes of reference, interpolating the coordinates of points along each measured line intermediate the measured points with the aid of a computer, passing a parametric polynomial arc through at least four points on each of said lines and establishing the equation of the curve through said points, passing a parametric polynomial arc through an adjacent set of at least four points, at least one of which is common to the first-named points, constructing chordal lines connecting corresponding points in each zone between each of its two boundary lines, constructing lines perpendicular to the chord of said zone at each section line, computing the chord height at corresponding points along each chord line, repeating the same steps for adjacent points along each of said chordal lines at predetermined intervals and computing the chord heights at each of said points, resolving the coordinates of the ends of said chord height lines into absolute coordinates, computing the tangent line drawn through each point in space thus computed in the direction of the corresponding boundary line at the corresponding point and in the direction of the section line through that point, computing the normal to the surface at that point which is defined by tangent lines, and correcting the coordinates of said points in space to compensate for the cutter radius of the milling tool, said compensation being accomplished by adjusting the coordinates of said points in space along the normal vector to said tangent lines.

4. The method set forth in claim 3 wherein the interpolated contours obtained from the draft point data at the ends of said contours are computed by passing a circle through adjacent points including the end points at each of said boundary lines and determining the equation of said circle whereby any point intermediate said measured points can be determined by establishing its principal coordinate axes.

5. A method for developing a three-dimensional, nonanalytical surface comprising closely spaced points in space including the steps of preparing a three-dimensional model, forming characteristic section lines on said model along principal character contours thereof at measured, spaced sections, dividing said surface into surface zones defined by boundary characteristic lines and by edge characteristic lines, measuring the coordinates of the points along said section lines, said boundary lines and said edge lines with reference to predetermined coordinate planes, plotting in two-dimensional form on a draft plate the coordinates of said measured points and plotting them on said draft plate in separate views representing the projected view of said surface in each of three principal coordinate planes, measuring selected points along the draft contours in each of said views and identifying them relative to two coordinate axes, registering the coordinates of said selected points on a data storing medium, determining the equation of a parametric polynomial curve through at least four of said selected points and recording the equation in a computer memory system, constructing a chordal line connecting an interpolated point on one boundary line with a corresponding point on the opposite boundary line, constructing lines intersecting said chordal line at a predetermined angle and extending in a common direction therefrom, constructing chordal lines connecting other interpolated points on one boundary line with the corresponding points on the opposite boundary line, constructing other vertical lines intersecting each of said boundary lines at a predetermined angle and extending in a common direction therefrom, connecting together with a chordal line two adjacent points in close proximity to the commonly extending lines, determining the intersection point between said commonly extending lines and the corresponding lines connecting the adjacent points interpolated on said section lines, connecting with a chordal line at each section the end point on one boundary line with a previously determined intersection point, constructing a chord height line extending from said last-mentioned chordal line, determining the intersection point between said last-mentioned chord height line and a chord line drawn between two points on said section line adjacent said last-mentioned chord height line, constructing a parametric polynomial curve through at least four points on said section line computed in the foregoing steps whereby a continuous curve is established between the points on said section lines intermediate said sections, determining the chord height between predetermined spaced points on each of the previously determined chord lines and said interpolated curve obtained in the foregoing step, constructing flow lines connecting the end points of said chord height lines and two adjacent corresponding points in space in the direction of the first axis, computing a corresponding grid line between said point in space and two other adjacent points thereto and extending in the direction of another axis, computing the slope of a tangent vector in each of said directions at said point in space, and determining the direction of unit normal vector to said tangent lines, resolving the coordinates of said point in space to absolute coordinates, compensating for the cutting tool radius by correcting said point coordinates and shifting them in the direction of said unit normal vector a distance equal to the cutter radius, repeating the foregoing steps for each adjacent point in space which determines said finished surface, registering the coordinates of each of said points in space in a computer memory system, recording the intelligence so obtained on a numerical control tape, and introducing said numerical control tape to a numerical control system for said machine tool whereby the original model surface is reproduced in three dimensions on the finished machined part.

6. The method as set forth in claim 5 wherein points are interpolated between an end point on said section line and the two adjacent points on said section line by fitting a circular curve through them, resolving the characteristic equation of said curve whereby points intermediate said end point and said adjacent points can be determined, and merging the curve containing said three points with a parabolic curve containing at least one of said three points with other points on said section whereby the contour of the section line can be computed throughout its entire extent.

7. The method set forth in claim 6 wherein said points in space define grid lines falling in the directions of transverse axes, partially differentiating each of said curves at the points of intersection for each of said points in space thereby determining the tangent vectors, determining the cross product of said tangent vectors to determine the unit normal vector, and compensating the coordinates of said points in space to accommodate the cutter diameter used for machining said surface.

8. The method as set forth in claim 5 wherein each of said chordal lines is bisected with a perpendicular bisector representing the chord height line at the midpoint thereof at each section, drawing a chord line between an end point on said section line falling on one boundary line and extending to said midpoint on said section, constructing a perpendicular bisector through said last-mentioned chord line and determining its point of intersection with said surface, and repeating said perpendicular bisection steps to determine a specified number of other points on said surface.

9. The method set forth in claim 8 wherein said points in space define grid lines falling in the directions of transverse axes, partially differentiating each of said curves at the points of intersection for each of said points in space thereby determining the tangent vectors, determining the cross product of said tangent vectors to determine the unit normal vector, and compensating the coordinates of said points in space to accommodate the cutter diameter used for machining said surface.

10. The method set forth in claim 5 wherein said chordal line is divided into a predetermined number of segments, constructing perpendicular chord height lines extending from said chord line in a common direction therefrom at the ends of each of said segments, and computing the points in space by the aforementioned method steps at the ends of each of said chord height lines.

References Cited

UNITED STATES PATENTS

| | | | |
|---|---|---|---|
| 3,010,656 | 11/1961 | Spencer | 90—13.99 |
| 3,021,463 | 2/1962 | Haldemann | 318—20.150 |
| 3,024,396 | 3/1962 | Peckjian | 318—20.150 |
| 3,026,040 | 3/1962 | Spencer | 90—13.99 |
| 3,178,717 | 4/1965 | Fengler | 90—13.99 |
| 3,187,247 | 6/1965 | Colten et al. | 90—13.99 |
| 3,328,655 | 6/1967 | Tripp | 235—151.11 |

FOREIGN PATENTS

| | | | |
|---|---|---|---|
| 1,016,038 | 1/1966 | Great Britain | 235—151 |

OTHER REFERENCES

Louis S. Gomolak: Better & Faster Design by Machine, June 1964, Electronics, 64–72.

E. C. Johnson: Interpolation, Programmed-System Design, September 1958, 153–157.

MALCOLM A. MORRISON, Primary Examiner

E. J. WISE, Assistant Examiner

U.S. Cl. X.R.

318—20